United States Patent
Sreedhara

(10) Patent No.: US 10,165,334 B2
(45) Date of Patent: Dec. 25, 2018

(54) SYSTEMS AND METHODS FOR ADJUSTING SUBTITLES SIZE ON A FIRST DEVICE AND CAUSING SIMULTANEOUS DISPLAY OF THE SUBTITLES ON A SECOND DEVICE

(71) Applicant: Rovi Guides, Inc., San Carlos, CA (US)

(72) Inventor: Arun Sreedhara, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 80 days.

(21) Appl. No.: 15/429,832

(22) Filed: Feb. 10, 2017

(65) Prior Publication Data
US 2018/0234739 A1  Aug. 16, 2018

(51) Int. Cl.
| | |
|---|---|
| H04N 21/488 | (2011.01) |
| H04N 21/442 | (2011.01) |
| H04N 21/431 | (2011.01) |
| H04N 21/485 | (2011.01) |
| H04N 21/41 | (2011.01) |
| H04N 21/45 | (2011.01) |
| H04N 21/466 | (2011.01) |
| H04N 21/4722 | (2011.01) |

(52) U.S. Cl.
CPC ..... *H04N 21/4884* (2013.01); *H04N 21/4126* (2013.01); *H04N 21/4312* (2013.01); *H04N 21/44218* (2013.01); *H04N 21/4532* (2013.01); *H04N 21/4661* (2013.01); *H04N 21/4722* (2013.01); *H04N 21/4858* (2013.01)

(58) Field of Classification Search
CPC ................................................. H04N 21/4884
See application file for complete search history.

(56) References Cited

U.S. PATENT DOCUMENTS

| | | |
|---|---|---|
| 5,805,153 A | 9/1998 | Nielsen |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |

(Continued)

OTHER PUBLICATIONS

Limer, "You'll Never Squint Again With This Automatically Resizing Font," Gizmodo, Feb. 11, 2013, 2 pages.

*Primary Examiner* — Michael H Hong
(74) *Attorney, Agent, or Firm* — Haley Guiliano LLP

(57) ABSTRACT

Systems and methods are provided herein for adapting, when multiple users are consuming a media asset on a primary device, the size of subtitles presented on the primary device upon determining that a user located closer to the primary device (i.e., first user) than a user farthest from the primary device (i.e., second user) is discontent with the size of the subtitles. The media guidance application may determine that there is a secondary device, associated with and in the vicinity of the second user, that is suitable for displaying subtitles. The media guidance application may, upon determining that the second user is currently not using the secondary device, present subtitles for the second user on the secondary device. The media guidance application may then adjust the size of the subtitles presented with the media asset on the primary device to a size more suited for the first user.

20 Claims, 8 Drawing Sheets

(56) References Cited

U.S. PATENT DOCUMENTS

| | | |
|---|---|---|
| 2002/0174430 A1 | 11/2002 | Ellis et al. |
| 2003/0108164 A1 | 6/2003 | Laurin et al. |
| 2003/0110499 A1 | 6/2003 | Knudson et al. |
| 2005/0251827 A1 | 11/2005 | Ellis et al. |
| 2008/0077965 A1 | 3/2008 | Kamimaki et al. |
| 2010/0106482 A1 | 4/2010 | Hardacker et al. |
| 2010/0146560 A1 | 6/2010 | Bonfrer |
| 2010/0153885 A1 | 6/2010 | Yates |
| 2010/0259676 A1* | 10/2010 | Swan .................. G06K 9/3266 348/468 |
| 2011/0164175 A1 | 7/2011 | Chung et al. |
| 2014/0184638 A1 | 7/2014 | Ramachandran et al. |

* cited by examiner

SYSTEMS AND METHODS FOR ADJUSTING SUBTITLES SIZE ON A FIRST DEVICE AND CAUSING SIMULTANEOUS DISPLAY OF THE SUBTITLES ON A SECOND DEVICE

BACKGROUND

In currently available media systems, the size of subtitles presented with a media asset may be adjusted based on a distance of a user from a device that the media asset is being consumed on. When multiple users, located at different distances from a device on which a media asset is being presented, are collectively consuming the media asset, the size of the subtitles may be based on the distance of the user farthest from the device. As a result, the size of the subtitles presented with the media asset may be larger than what it would have been if it were based on a distance of a user closer to the device. The larger subtitle size may be disruptive to the media consumption experience of a user whose position is closer to the device. However, current systems, when determining subtitle size for multiple users, do not take into account the impact of subtitle size on the user media consumption experience of a user when determining the subtitle size. Thus, current systems are not suited for adapting subtitle size for optimal user experience when multiple users at different distances from a device are collectively consuming a media asset presented on the device.

SUMMARY

Therefore, systems and methods are disclosed herein for adapting, when multiple users are collectively consuming a media asset on a primary device, the size of subtitles presented on the primary device in response to determining that a user located closer to the primary device (i.e., first user) than a user farthest from the primary device (i.e., second user) is discontent with the size of the subtitles. A media guidance application may determine size of subtitles to be presented with the media asset based on distance of the second user. The media guidance application may determine that the first user is discontent with the size of the subtitles. In response, the media guidance application may determine whether there is a secondary device, associated with and in the vicinity of the second user, that is suitable for displaying subtitles. If there is such a secondary device, the media guidance application may determine whether the second user is currently using the secondary device. The media guidance application, upon determining that the second user is not using the secondary device, may present subtitles to the second user on the secondary device. The media guidance application may then adjust the size of the subtitles presented with the media asset on the primary device to a size more suited for the first user.

In some embodiments, the media guidance application may detect, using a first sensor device, a first user and a second user within a viewing area associated with a first user equipment device. A viewing area may be some pre-defined area in front of the first user equipment such that anyone within the pre-defined area can comfortably read subtitles presented in a specific size. For example, the viewing area may be defined based on a viewing axis that is perpendicular to the display screen of the first user equipment device. As a matter of example, any point that is within a forty-five degree angle to the viewing axis and within ten feet from the display screen of the first user equipment device may be included in the viewing area. For example, the media guidance application may detect, using a camera, that the first user and the second user are at locations that are within a forty-five degree angle to the viewing axis and within ten feet from the display screen of a television.

The media guidance application may determine, based on data received from the first sensor device, a first distance of the first user from the first user equipment device and a second distance of the second user from the first user equipment device, where the first distance is shorter than the second distance. The media guidance application may determine, based on user location data received from the camera, that the first user is at a distance of two feet from the television and the second user is at a distance of seven feet from the television. The media guidance application may access a subtitle adjustment data structure, that includes a first field corresponding to a given user distance from a given user equipment device and a second field corresponding to an optimal subtitle size for the given user distance, to determine a first size for subtitles to be displayed with a media asset currently being displayed on the first user equipment device. For example, media guidance application may access a subtitle adjustment data structure to determine an entry that is associated with a first field value of seven feet. The media guidance application may retrieve the value corresponding to the second field of the entry to determine the optimal subtitle size for a distance of seven feet. For example, the media guidance application may determine that the optimal subtitle size for a distance of seven feet is two hundred points.

The media guidance application may generate for display, on the first user equipment device, the subtitles in the first size. For example, the media guidance application may generate subtitles with a size of two hundred points on the television. The media guidance application may determine that the first user is discontent with the first size. For example, the media guidance application may monitor indicators of response to an event to determine the response of the first user to the first size. Indicators of response to an event can be, but are not limited to, actions associated with the event (e.g., trying to decrease subtitle size, making the display window bigger and other suitable actions), user's activity during the event (e.g., user's social media activity, user's movements, and other suitable activity) and user's physiological and emotional responses (e.g., user's heart rate, facial expressions and other responses). The media guidance application may access a variety of monitoring devices (e.g., image and video capture devices, motion, physiological, and neurological sensors and other suitable monitoring devices) to monitor for the indicators of response. For example, media guidance application may determine, based on data retrieved from a camera and facial recognition techniques, that the facial expression of the first user following the presentation of the subtitles is a frown.

The media guidance application may access a data structure (e.g., a look-up table) to determine a response that corresponds to a given indicator of response. For example, the media guidance application may determine that a frown corresponds to an expression of discontent. The media guidance application may then determine that the first user is discontent with the subtitle size of two hundred points. The media guidance application may, in response to determining that the first user is discontent with the first size, access a user profile associated with the second user to determine a second user equipment device associated with the second user that is within the viewing area. For example, the media guidance application may access the second user's user profile to determine an identifier of a user equipment device associated with the second user. The media guidance application may then use a variety of location detection techniques (e.g., triangulation, scene analysis, proximity) to determine a current location of the user equipment device associated with the second user.

As a specific example, the media guidance application may instruct a Bluetooth low energy beacon to broadcast a signal over a given radius. A given user equipment device in the given radius may receive the signal at some signal strength and relay information about the received signal strength to the media guidance application. The media guidance application may determine, based on the signal strength received by the given user equipment device and data regarding impact of distance on signal strength attenuation, a current location of the given user equipment device. The media guidance application may then compare the current location of the given user equipment device with locations included in the viewing area to determine whether the given user equipment device is in the viewing area. The media guidance application may compare an identifier associated with the given user equipment device with identifiers of user equipment devices associated with the second user to determine whether the given user equipment device is associated with the second user. In some embodiments, the media guidance application may determine that the given user equipment device is associated with the second user and located within the viewing area. For example, the media guidance application may determine that a smart-phone is associated with the second user and located within the viewing area associated with the television.

The media guidance application may determine, based on usage data of the second user equipment device, a current engagement level of the second user in the second user equipment device. For example, the media guidance application may access a data structure associated with the second user equipment device (e.g., usage metrics data structure) to retrieve usage data of the second user equipment device. The usage metrics data structure may contain information such as, but not limited to, number of applications running on the second user equipment device, type of applications running on the second user equipment device, number of user input received at the second user equipment device during a given period of time, processor activity of the second user equipment device and other suitable information. Engagement level in a user equipment device, as used herein, is defined to mean a qualitative or quantitative indicator of how much a user is utilizing the user equipment device. For example, the engagement level may be a numerical value (e.g., five) on a pre-defined scale (e.g., a scale ranging from zero to ten where zero corresponds to no engagement and ten corresponds to maximum engagement). As a matter of example, the media guidance application may determine, based on the retrieved usage data of the smart-phone, that no application is running on the smart-phone. The media guidance application may access a look-up table to determine that the engagement level that corresponds to no application running on the smart-phone is zero.

The media guidance application may determine, based on the current engagement level of the second user being lower than a threshold engagement level, that the second user is not engaged in the second user equipment device. For example, the threshold engagement level may be five and the media guidance application may determine that the current engagement level of zero in the smart-phone is less than the threshold engagement level. The media guidance application may, in response to determining that the user is not engaged in the second user equipment device, transmit the subtitles to the second user equipment device. For example, the media guidance application may transmit the subtitles for the media asset currently being presented on the television to the smartphone. The media guidance application may determine, based on accessing the subtitle adjustment data structure, a second size for subtitles to be displayed with the media asset currently being displayed on the first user equipment device. As an illustrative example, the media guidance application may access the subtitle adjustment data structure and determine that a subtitle size of one hundred points corresponds to a distance of two feet. The media guidance application may generate for display, on the first user equipment device, the subtitles in the second size. For example, the media guidance application may generate subtitles with a size of one hundred points on the television.

In some embodiments, the media guidance application may, upon determining that the second user is using the secondary device, change the language of the audio track of the media asset to a language that the second user is more familiar with so that the second user is less reliant on the subtitles. The media guidance application may then decrease the size of the subtitles presented with the media asset on the primary device. In some embodiments, the audio track associated with the media asset currently being displayed on the first user equipment device may be in a first language and the subtitles may be in a second language. For example, the audio track associated with the media asset currently being displayed on the television may be in Spanish and the subtitles may be in English. The media guidance application may, in response to determining that the user is engaged in the second user equipment device, access the user profile associated with the second user to determine a preferred language associated with the second user. As a matter of example, the second user may be actively using the web browsing application on the smartphone and this may be reflected in the usage metrics data structure associated with the smart-phone. The media guidance application may determine, in manners described previously in relation to determining an engagement level in a user equipment device, that the second user is engaged in the smart-phone. In response, the media guidance application may access the second user's user profile to retrieve the second user's preferred language.

The media guidance application may determine that the preferred language associated with the second user is a third language, where the third language is not the first language. For example, the media guidance application may determine that the second user's preferred language is French. The media guidance application may use a Boolean comparison function to determine whether the first language and the third language are the same. The media guidance application may determine (e.g., based on receiving a "false" result from the Boolean comparison function) that the first language and the third language are different. The media guidance application may, in response to determining that the preferred language associated with the second user is the third language, determine whether there exists an alternative audio track that is associated with the media asset and is in the third language. In some embodiments, the media guidance application may extract, using metadata extraction tools, information about audio tracks associated with a media asset from metadata associated with the media asset. In some embodiments, the media guidance application may query, using database management languages such as SQL, JAPQL, CODASYL or another suitable language, a content listing database for a specific audio track that is associated with the media asset. As a matter of example, the media guidance application may query a content listing database for a French audio track associated with the media asset currently being presented on the television.

The media guidance application may, in response to determining that an alternative audio track that is associated with the media asset and in the third language exists, retrieve the alternative audio track. For example, the media guidance application may receive a positive result to the query for a French audio track associated with the media asset currently being presented on the television. The result may include a unique or specific identifier associated with the French audio track or a pointer or link to the French audio track, which the media guidance application may use to retrieve the French audio track. In some embodiments, the media guidance application may receive the French audio track itself in response to the query. The media guidance application may substitute the audio track associated with the media asset with the alternative audio track in the third language. The media guidance application may substitute the Spanish audio track of the media asset currently being presented on the television with the French audio track. The media guidance application may generate for simultaneous display with the media asset, on the first user equipment device, the subtitles in the second language and in the second size. For example, the media guidance application may display on the television, simultaneously with the media asset, the English subtitles in a size of one hundred points.

In some embodiments, the language of the subtitles may the same as the language of the original audio track. Specifically, the second language may be the same as the first language. For example, the original soundtrack and the subtitles may both be in Spanish. In some embodiments, the language of the subtitles may be the same as the language that the second user is more familiar with. Specifically, the second language may be the same as the third language. For example, the second user's preferred language may be French and the language of subtitles may also be French. In some embodiments, the language of the subtitles may be different from both the language of the original audio track and the language that the second user is more familiar with. Specifically, the second language may be different from both the first language and the third language. Following from the previous example, the original audio track may be in Spanish, the second user's preferred language may be French and the subtitles may be in English.

In some embodiments, the media guidance application may, when displaying subtitles on the primary device, determine that both the first user and the second user prefer the same font and present the subtitles in that font. Specifically, the media guidance application may, when generating for display the subtitles in the first size on the first user equipment device, determine, based on accessing a user profile associated with the first user, a first font preferred by the first user. For example, the media guidance application may access a user preferences data structure associated with the first user's user profile and retrieve the first user's preferred font. For example, the media guidance application may determine that the first user's preferred font is "Courier New." The media guidance application may determine, based on accessing the user profile associated with the second user, a second font preferred by the second user. For example, the media guidance application may access a user preferences data structure associated with the second user's user profile and retrieve the second user's preferred font. For example, the media guidance application may determine that the second user's preferred font is "Courier New." The media guidance application may compare the first font with the second font to determine whether the first font is the same as the second font. For example, the media guidance application may use a Boolean comparison function to determine whether a unique identifier of the first font matches a unique identifier of the second font. The media guidance application may, in response to determining that the first font is the same as the second font, generate for display the subtitles in the first size and in the first font. For example, the media guidance application may determine that the first font is the same as the second font upon receiving a "true" result from the Boolean comparison function. The media guidance application may then display the subtitles on the television with a size of two hundred points and in the "Courier New" font.

In some embodiments, the media guidance application may, when displaying subtitles on the primary device, determine that the first user and the second user prefer different fonts. In such instances, the media guidance application may display the subtitles in another font that is similar to the fonts that the first user and the second user prefer. Specifically, in response to determining that the first font is not the same as the second font, the media guidance application may access a font selector data structure that includes a third field corresponding to a given font, a fourth field corresponding to another given font, and a fifth field corresponding to a font similar to both the given font and the another given font. As a matter of example, the media guidance application may determine, in manners described previously in relation to determining a user's preferred font, that the first user's preferred font is "Courier New" and the second user's preferred font is "Times New Roman." The media guidance application may use a Boolean comparison function to determine whether a unique identifier for "Courier New" font matches a unique identifier for "Times New Roman." The media guidance application may determine that the two fonts are different upon receiving a "false" result from the from the Boolean comparison function.

The media guidance application may determine, based on entries in the font selector data structure, whether there exists a third font that is similar to both the first font and the second font. For example, the media guidance application may query the font selector data structure for an entry that has a third field value of the first font and a fourth field value of the second font to determine whether the third font exists. As an illustrative example, the media guidance application may use SQL SELECT command (e.g., SELECT*FROM "font selector data structure" WHERE ("third field value"="Courier New") AND ("fourth field value"="Times New Roman") to perform the query. The media guidance application may determine that the third font exists upon receiving a positive query result. The query result may return a unique identifier corresponding to an entry associated with both the first font and the second font, a pointer or link to an entry associated with both the first font and the second font, or an entry associated with both the first font and the second font itself. The media guidance application may retrieve the value corresponding to the fifth field in an entry associated with both the first font and the second font to determine the third font. For example, the media guidance application may determine, based on an entry in the font selector data structure, that the "Arial" font is similar to both the "Courier New" and "Times New Roman" fonts. The media guidance application may, in response to determining that the third font exists, generate for display the subtitles in the first size and in the third font. For example, the media guidance application may display the subtitles on the television with a size of two hundred points and in the "Arial" font.

In some embodiments, the media guidance application may retrieve a specific file in order to display the subtitles in another font that is similar to both of the fonts that the first user and the second user prefer. Specifically, the media guidance application may determine, based on accessing a system requirements data structure associated with the third font, a file required to display the third font. For example, the media guidance application may access a system requirements data structure associated with "Arial" font and determine that an "Arial" font package is required in order to display the "Arial" font. The media guidance application may determine, based on accessing a system characteristics data structure associated with the first user equipment device, that the first user equipment device is not associated with the file required to display the third font. For example, the media guidance application may access a system characteristics data structure associated with the television and query for an "Arial" font package. The media guidance application may determine, based on receiving a null query result, that the television is not associated with the "Arial" font package.

The media guidance application may transmit, to a remote server, a request for the file required to display the third font. For example, the media guidance application may transmit, using a suitable communication protocol, a request to a font library remote server for the "Arial" font package. The media guidance application may receive, at the first user equipment device, the file required to display the third font. For example, the media guidance application may receive a pointer or link to the "Arial" font package. The media guidance application may retrieve the "Arial" font package using the pointer or the link and store it at the television. The media guidance application may, alternatively, receive the "Arial" font package itself from the font library remote server. The media guidance application may generate for display, based on the file required to display the third font, the subtitles in the third font. The media guidance application may display, using the "Arial" font package, the subtitles on the television in the "Arial" font.

In some embodiments, the media guidance application may display the subtitles in another font that is similar to both the fonts that the first user and the second user prefer upon determining that the primary device supports the display of the another font. Specifically, the media guidance application may determine, based on accessing a system requirements data structure associated with the third font, a system feature required to display the third font. System feature, as used herein, is defined to mean a technical characteristic associated with a user equipment device. For example, a system feature of a user equipment device may be, but is not limited to, processing power, operating system, display, network connectivity, and memory of the user equipment device. For example, the media guidance application may access a system requirements data structure associated with "Arial" font and determine that a specific operating system (e.g., macintosh operating system) is required in order to display the "Arial" font.

The media guidance application may determine, based on accessing a system characteristics data structure associated with the first user equipment device, whether the first user equipment device is compatible with the system feature required to display the third font. For example, the media guidance application may access a system characteristics data structure associated with the television to retrieve an operating system that is associated with the television (e.g., macintosh operating system). In some embodiments, the media guidance application may determine, based on the system feature required to display the third font matching a system feature associated with the first user equipment device, that the first user equipment device is compatible with the system feature required to display the third font. The media guidance application may, in response to determining that the first user equipment device is compatible with the system feature required to display the third font, generate for display the subtitles in the third font. Following from the previous example, the media guidance application may determine, because the operating system of the television is the same as the operating system required to display the "Arial" font, that the operating system of the television is compatible with the operating system required to display the "Arial" font. The media guidance application may then display subtitles on the television in the "Arial" font.

In some embodiments, when the first user and the second user prefer different fonts and the subtitles are transmitted to the secondary device, the media guidance application may transmit the subtitles to the secondary device in a font that is preferred by the second user. The media guidance application may then, in addition to changing the size of the subtitles on the primary device, also change the font of the subtitles displayed on the primary to the font preferred by the first user. Specifically, the media guidance application may, when transmitting the subtitles to the second user equipment device, transmit the subtitles in the second font. The media guidance application may, when generating for display the subtitles in the second size on the first user equipment device, generate for display the subtitles in the first font. Following from the previous example, where the first user's preferred font is "Courier New" and the second user's preferred font is "Times New Roman," the media guidance application may transmit subtitles to the second user's smart-phone in the "Times New Roman" font. The media guidance application may display, on the television, subtitles with a size of one hundred points and in the "Courier New" font.

In some embodiments, the media guidance application may determine that there is no other font that is similar to both the fonts that the first user and the second user prefer. The media guidance application may then display the subtitles in a default font. Specifically, the media guidance application may, in response to determining that the third font does not exist, generate for display the subtitles in the first size and in a default font. For example, the media guidance application may query, in manners described previously in relation to querying a font selector data structure, the font selector data structure for a font that is similar to both "Courier New" and "Times New Roman." The media guidance application may determine, upon receiving a null result for the query, that there is no font similar to both "Courier New" and "Times New Roman." The media guidance application may access a data structure (e.g., default system settings data structure) to retrieve a default font. For example, the media guidance application may retrieve the font "Cambria" as the default font. The media guidance application may display, on the television, subtitles with a size of two hundred points and in the "Cambria" font.

In some embodiments, the media guidance application may detect, at a point in time after size of subtitles on the primary device has been adjusted to a size more suited for the first user, that the first user has left the viewing area. The media guidance application may then stop transmitting the subtitles to the secondary device and adjust the size of subtitles on the primary device back to the size suited for the second user. Specifically, the media guidance application may detect that the first user is no longer within the viewing area associated with a first user equipment device. For example, the media guidance application may determine, based on data received from a camera, that the first user is not present within the viewing area associated with the television. The media guidance application may, in response to detecting that the first user is no longer within the viewing area, discontinue transmission of the subtitles to the second user equipment device. The media guidance application may generate for display, on the first user equipment device, the subtitles in the first size. For example, the media guidance application may stop transmitting the subtitles to the second user's smart-phone and display the subtitles, with a size of two hundred points, on the television instead.

Conventional systems are limited to adapting subtitle size based on a distance of a user from a user equipment device. When multiple users are collectively consuming a media asset, size of subtitles presented with the media asset may not be suitable for all users and may be disruptive to the media consumption experience of some user. Conventional systems do not use a feedback system for further adapting subtitle size based on a user's response to the subtitle size and thus may result in sub-optimal media consumption experience for some users. Systems and methods provided herein address this issue by adapting, upon determining that a first user is discontent with a current subtitle size on a primary user equipment device, subtitle size on the primary device while transmitting the subtitles to a secondary device associated with a second user.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The described systems and methods adapt, when multiple users are collectively consuming a media asset on a primary device, the size of subtitles presented on the primary device in response to determining that a user located closer to the primary device (i.e., first user) than a user farthest from the primary device (i.e., second user) is discontent with the size of the subtitles. A media guidance application may determine size of subtitles to be presented with the media asset based on distance of the second user. The media guidance application may determine that the first user is discontent with the size of the subtitles. In response, the media guidance application may determine whether there is a secondary device, associated with and in the vicinity of the second user that is suitable for displaying subtitles. If there is such a secondary device, the media guidance application may determine whether the second user is currently using the secondary device. The media guidance application, upon determining that the second user is not using the secondary device, may present subtitles to the second user on the secondary device. The media guidance application may then adjust the size of the subtitles presented with the media asset on the primary device to a size more suited for the first user.

Figure 5:
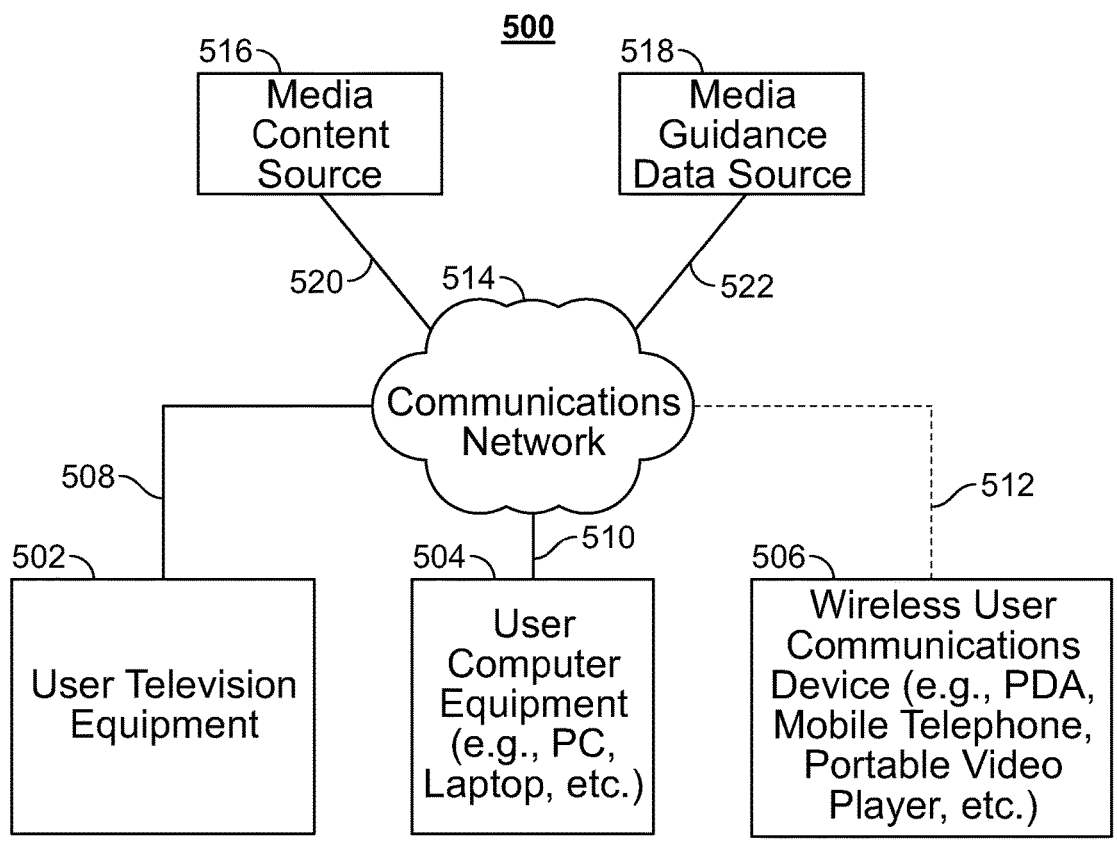
FIG. 5 is a block diagram of an illustrative media system in accordance with some embodiments of the disclosure.

The media guidance application may reside on user television equipment 502 (FIG. 5), user computer equipment 504 (FIG. 5), and/or wireless user communications device 506 (FIG. 5). In some embodiments, some or all portions of the media guidance application may be located at media content source 516 (FIG. 5) and/or media guidance data source 518 (FIG. 5). In some embodiments, portions of the media guidance application may be located on each of user television equipment 502 (FIG. 5), user computer equipment 504 (FIG. 5), wireless user communications device 506 (FIG. 5), media content source 516 (FIG. 5) and media guidance data source 518 (FIG. 5).

Figure 1:
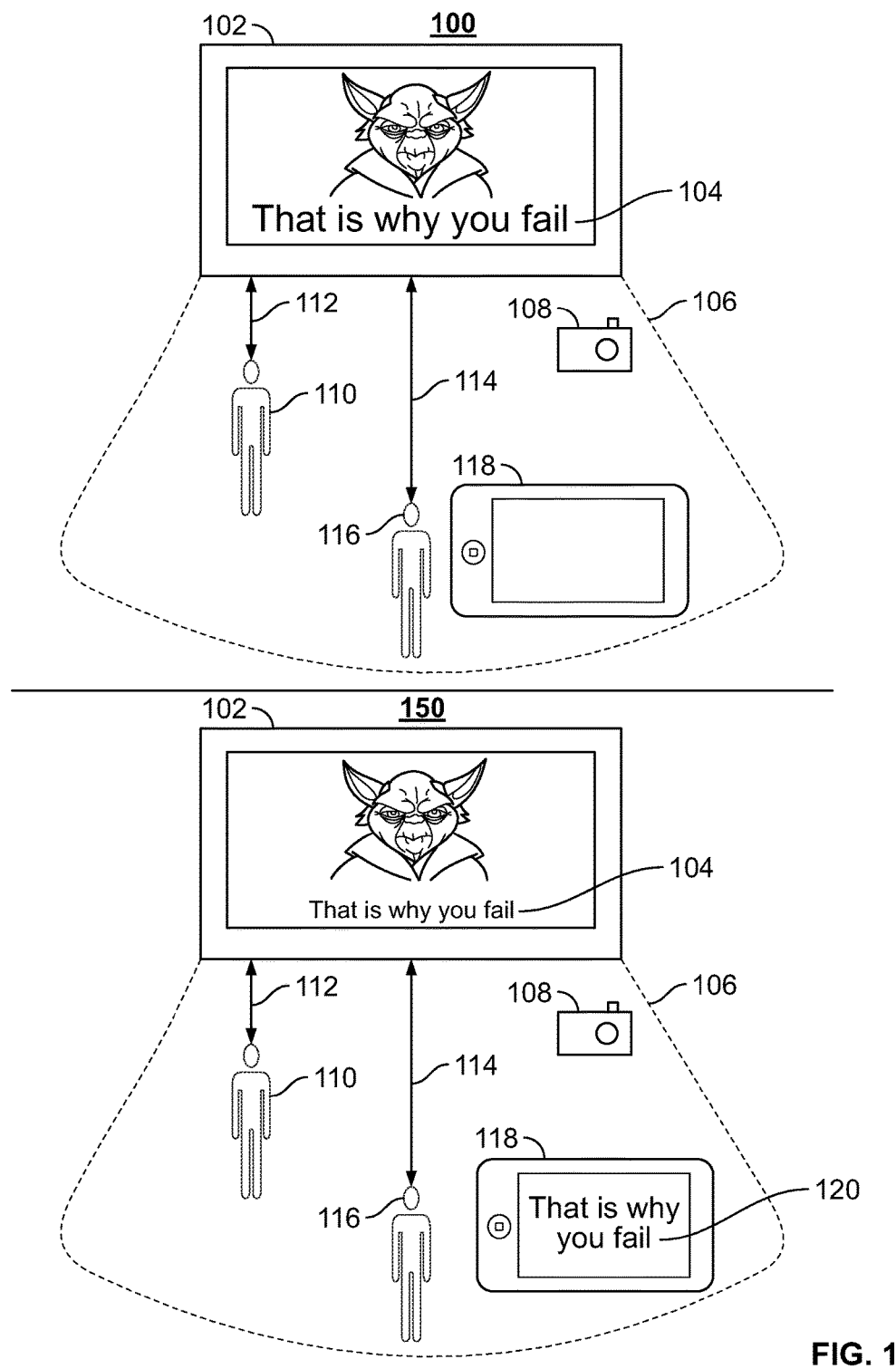
FIG. 1 shows user equipment devices for displaying subtitles, in accordance with some embodiments of the disclosure.

FIG. 1 shows user equipment devices for displaying subtitles, in accordance with some embodiments of the disclosure. FIG. 1 depicts user 110 and user 116 collectively consuming a media asset on user equipment device 102 at a time 100. The media guidance application may determine that the viewing area associated with user equipment device 102 is viewing area 106. The media guidance application may determine, using data from sensor device 108, distance 112 of user 110 from user equipment device 102. The media guidance application may similarly determine distance 114 of user 116 from user equipment device 102. The media guidance application may determine size of subtitles 104 based on distance 112 and distance 114. The media guidance application may then generate for display, on user equipment device 102, subtitles 104 in the determined size. The media guidance application may determine that user 110, who is closer to the user equipment device 102, is discontent with the size of subtitles 104. The media guidance application may determine that user equipment device 118 is associated with user 116 and that user equipment device 118 is within viewing area 106. The media guidance application may, upon determining that user 116 is currently not utilizing user equipment device 118, transmit subtitles to user equipment device 118. As depicted in FIG. 1, at time 150 later than time 100, the media guidance application may adjust size of subtitles 104 to a size more suited for user 110. The media guidance application may simultaneously display subtitles 120 on user equipment device 118. Control circuitry that executes a media guidance application on any user equipment may generate for display subtitles 104 and subtitles 120. The functionality of user equipment, control circuitry, and the media guidance application is described in further detail below with respect to FIGS. 2-5. Control circuitry may cause subtitles 104 and subtitles 120 to be presented using the one or more of the processes described in FIGS. 6-9.

The media guidance application may detect, using a first sensor device, a first user and a second user within a viewing area associated with a first user equipment device. Sensor device may include, but it not limited to, image capture devices, motion sensors, wireless signal detectors, electromagnetic ray detectors and other suitable sensor devices. A viewing area may be some pre-defined area in front of the first user equipment device such that anyone within the pre-defined area can comfortably read subtitles presented in a specific size. As an illustrative example, viewing area 106 may be defined based on a viewing axis that is perpendicular to the display screen of user equipment device 102. As a matter of example, any point that is within a forty-five degree angle to the viewing axis and within ten feet from the display screen of the user equipment device 102 may be included in the viewing area 106. The media guidance application may retrieve data from sensor device 108 and analyze the data to determine a location of user 110 and a location of user 116. The media guidance application may compare locations of user 110 and user 116 with locations included in viewing area 106. The media guidance application may determine, based on locations of user 110 and user 116 matching locations included in viewing area 106, that user 110 and user 116 are within viewing area 106. For example, the media guidance application may detect, using sensor device 108 (e.g., a camera), that user 110 and user 116 are at locations that are within a forty-five degree angle to the viewing axis and within ten feet from the display screen of user equipment device 102.

The media guidance application may determine, based on data received from the first sensor device, a first distance of the first user from the first user equipment device and a second distance of the second user from the first user equipment device, where the first distance is shorter than the second distance. The media guidance application may retrieve, from data received from sensor device 108, location data corresponding to user 110 (i.e., distance 112) and location data corresponding to user 116 (i.e., distance 114). For example, the media guidance application may determine that distance 112 is two feet and distance 114 is seven feet. The media guidance application may use a comparison function to determine which of distance 112 and distance 114 is greater.

The media guidance application may access a subtitle adjustment data structure, that includes a first field corresponding to a given user distance from a given user equipment device and a second field corresponding to an optimal subtitle size for the given user distance, to determine a first size for subtitles to be displayed with a media asset currently being displayed on user equipment device. As an illustrative example, the subtitle adjustment data structure may be a subtitle adjustment database. The media guidance application may query, using database management languages such as SQL, JAPQL, CODASYL or another suitable language, the subtitle adjustment database for an entry that is associated with a first field value of distance 114 (e.g., seven feet). The media guidance application may retrieve the value corresponding to the second field of the entry to determine the optimal subtitle size for distance 114 (e.g., seven feet). For example, the media guidance application may determine that the optimal subtitle size for distance 114 (e.g., seven feet) is two hundred points. In some embodiments, the subtitle adjustment data structure may be other suitable data storage structures (e.g., linked lists, arrays) without departing from the scope of this invention.

The media guidance application may generate for display, on the first user equipment device, the subtitles in the first size. For example, the media guidance application may generate subtitles 104 with a size of two hundred points on user equipment device 102 (e.g., television). The media guidance application may determine that the first user is discontent with the first size. For example, the media guidance application may monitor indicators of response to an event to determine the response of the first user to the first size. Indicators of response to an event can be, but are not limited to, actions associated with the event (e.g., trying to decrease subtitle size, making the display window bigger and other suitable actions), user's activity during the event (e.g., user's social media activity, user's movements, and other suitable activity) and user's physiological and emotional responses (e.g., user's heart rate, facial expressions and other responses). The media guidance application may access a variety of monitoring devices (e.g., image and video capture devices, motion, physiological, and neurological sensors and other suitable monitoring devices) to monitor for the indicators of response. For example, media guidance application may determine, based on data retrieved from a camera and facial recognition techniques, that the facial expression of user 110 following the presentation of subtitles 104 is a frown.

The media guidance application may access a data structure (e.g., a look-up table) to determine a response that corresponds to a given indicator of response. For example, the media guidance application may determine that a frown corresponds to an expression of discontent. The media guidance application may then determine that user 110 is discontent with the subtitle size of two hundred points. The media guidance application may, in response to determining that the first user is discontent with the first size, access a user profile associated with the second user to determine a second user equipment device associated with the second user that is within the viewing area. The user profile associated with the second user may be stored locally and/or at a remote location accessible via a communications network. In some embodiments, the user profile associated with the second user may include information about both user equipment devices associated with the second user and current locations of the user equipment devices associated with the second user. In such instances, the media guidance application may compare a current location of a given user equipment device of the user equipment devices associated with the second user with location included in the viewing area associated with the first user equipment device to determine whether the given user equipment device is within the viewing area.

In some embodiments, the user profile associated with the second user may not include information current locations of user equipment devices associated with the second user. In such instances, the media guidance application may use a variety of location detection techniques (e.g., triangulation, scene analysis, proximity and other suitable location detection techniques) to determine a current location of the user equipment device associated with the second user. In some embodiments, the media guidance application may measure distance of a user equipment device from multiple reference points to determine the exact location of the user equipment device. In some embodiments, the media guidance application may instruct a transmitter to transmit ultra-sound or radio waves and measure time taken to receive reflected wave at a receiver (i.e., round trip time). The media guidance application may then determine a distance of the user equipment device from the transmitter based on the round trip time. In some embodiments, the media guidance application may determine the current location of a user equipment device based on a wireless cellular access point that the user equipment device is connected to. In some embodiments, a user equipment device may transmit (e.g., as push notification or a pull notification) its current location (e.g., GPS coordinates) to a remote server. The media guidance application may access the remote server to retrieve the current location of the user equipment device.

As a specific example, the media guidance application may instruct a Bluetooth low energy beacon to broadcast a signal over a given radius where the given radius encompasses viewing area 106. User equipment device 118 in the given radius may receive the signal at some signal strength and relay information about the received signal strength to the media guidance application. The media guidance application may determine, based on the signal strength received by user equipment device 118 and data regarding impact of distance on signal strength attenuation, a current location of user equipment device 118. The media guidance application may then compare the current location of user equipment device 118 with locations included in viewing area 106 to determine whether user equipment device 118 is in viewing area 106. The media guidance application may access user 116's user profile to determine identifier(s) of user equipment device(s) associated with user 116. The media guidance application may compare an identifier associated with user equipment device 118 with identifier(s) of user equipment device(s) associated with user 116 to determine whether user equipment device 118 is associated with user 116. In some embodiments, the media guidance application may determine that user equipment device 118 is associated with user 116 and located within viewing area 106 associated with user equipment device 102 (e.g., a television).

The media guidance application may determine, based on usage data of the second user equipment device, a current engagement level of the second user in the second user equipment device. For example, the media guidance application may access a data structure associated with the user equipment device 118 (e.g., usage metrics data structure) to retrieve usage data of the user equipment device 118. The usage metrics data structure may contain information such as, but not limited to, the number of applications running on the second user equipment device, the type of applications running on the second user equipment device, the number of user inputs received at the second user equipment device during a given period of time, the processor activity of the second user equipment device and other suitable information. Engagement level in a user equipment device, as used herein, is defined to mean a qualitative or quantitative indicator of how much a user is utilizing the user equipment device. For example, level of engagement may be fuzzy logic variables such as "not engaged," "moderately engaged" and "highly engaged." For example, the engagement level may be a numerical value (e.g., five) on a pre-defined scale (e.g., scale ranging from zero to ten where zero corresponds to no engagement and ten corresponds to maximum engagement). As a matter of example, the media guidance application may determine, based on the retrieved usage data of user equipment device 118 (e.g., smart-phone), that no application is running on user equipment device 118. The media guidance application may access a look-up table to determine that the engagement level that corresponds to no application running on user equipment device 118 is zero.

The media guidance application may determine, based on the current engagement level of the second user in the second user equipment device being lower than a threshold engagement level, that the second user is not engaged in the second user equipment device. The media guidance application may access a data structure (e.g., a default system settings data structure) to retrieve the threshold engagement level. As a matter of example, the threshold engagement level may be five. The media guidance application may compare, using an appropriate comparison function, the threshold engagement level with the current engagement level of the second user in the second user equipment device to determine which is greater. Following from the previous example, where the engagement level of user 116 in user equipment device 118 is zero, the media guidance application may determine that the current engagement level in user equipment device 118 is less than the threshold engagement level. The media guidance application may, in response to determining that the user is not engaged in the second user equipment device, transmit the subtitles to the second user equipment device. For example, the media guidance application may transmit, using a suitable communication network, the subtitles for the media asset currently being presented on user equipment device 102 to user equipment device 118. The media guidance application may determine, based on accessing the subtitle adjustment data structure, a second size for subtitles to be displayed with the media asset currently being displayed on the first user equipment device. As an illustrative example, the media guidance application may access the subtitle adjustment data structure and determine that a subtitle size of hundred points corresponds to distance 112 (e.g., two feet). The media guidance application may generate for display, on the first user equipment device, the subtitles in the second size. For example, the media guidance application may generate subtitles 104 with a size of one hundred points on user equipment device 102.

In some embodiments, the media guidance application may, upon determining that the second user is using the secondary device, change the language of the audio track of the media asset to a language that the second user is more familiar with so that the second user is less reliant on the subtitles. The media guidance application may then decrease the size of the subtitles presented with the media asset on the primary device. In some embodiments, the audio track associated with the media asset currently being displayed on the first user equipment device may be in a first language and the subtitles may be in a second language. For example, the audio track associated with the media asset currently being consumed on user equipment device 102 may be in Spanish and the subtitles may be in English. The media guidance application may, in response to determining that the user is engaged in the second user equipment device, access the user profile associated with the second user to determine a preferred language associated with the second user. As a matter of example, user 116 may be actively using the web browsing application on user equipment device 118, and this may be reflected in the usage metrics data structure associated with user equipment device 118. The media guidance application may determine, in manners described previously in relation to determining an engagement level in a user equipment device, that user 116 is engaged in user equipment device 118. In response, the media guidance application may access user 116's user profile to retrieve user 116's preferred language.

The media guidance application may determine that the preferred language associated with the second user is a third language, where the third language is not the first language. For example, the media guidance application may determine that user 116's preferred language is French. The media guidance application may use a Boolean comparison function to determine whether the first language and the third language are the same. The media guidance application may determine (e.g., based on receiving a "false" result from the Boolean comparison function) that the first language and the third language are different. The media guidance application may, in response to determining that the preferred language associated with the second user is the third language, determine whether there exists an alternative audio track that is associated with the media asset and in the third language. In some embodiments, the media guidance application may extract, using metadata extraction tools, information about audio tracks associated with a media asset from metadata associated with the media asset. In some embodiments, the media guidance application may query, using database management languages such as SQL, JAPQL, CODASYL or another suitable language, a content listing database for a specific audio track that is associated with the media asset. As a matter of example, the media guidance application may query a content listing database for a French audio track associated with the media asset currently being presented on user equipment device 102.

The media guidance application may, in response to determining that an alternative audio track that is associated with the media asset and in the third language exists, retrieve the alternative audio track. For example, the media guidance application may receive a positive result to the query for a French audio track associated with the media asset currently being presented on user equipment device 102. The result may include a unique or specific identifier associated with the French audio track or a pointer or link to the French audio track which the media guidance application may use to retrieve the French audio track. In some embodiments, the media guidance application may receive the French audio track itself in response to the query. The media guidance application may substitute the audio track associated with the media asset with the alternative audio track in the third language. The media guidance application may substitute the Spanish audio track of the media asset currently being presented on user equipment device 102 with the French audio track. The media guidance application may generate for simultaneous display with the media asset, on user equipment device 102, the subtitles in the second language and in the second size. For example, the media guidance application may display on user equipment device 102, simultaneously with the media asset, the English subtitles in a size of one hundred points. The media guidance application may present, at the first user equipment device, the audio track in the third language simultaneously with the subtitles in the second language and in the second size. In some embodiments, the media guidance application may determine, after substituting the audio track associated with the media asset with the alternative audio track in the third language, whether the first user requires the subtitles in the second language. For example, the media guidance application may access a user profile associated with the first user to determine whether the first user is fluent in the third language. The media guidance application may, upon determining that the first user is fluent in the third language, refrain from presenting subtitles on the first user equipment device.

In some embodiments, the media guidance application may, upon determining that the second user is using the secondary device, determine whether the second user is using the audio system associated with the secondary device. The media guidance application may, upon determining that the second user is not using the audio system associated with the secondary device, transmit an audio track that is associated with the media asset and in a language that the second user is more familiar with to the secondary device. The media guidance application may, because the second user is less reliant on the subtitles, adjust the size of subtitles on the primary device to a size more suited to the first user.

In some embodiments, the language of the subtitles may be the same as the language of the original audio track. Specifically, the second language may be the same as the first language. For example, the original soundtrack and the subtitles may both be in Spanish. In some embodiments, the language of the subtitles may be the same as the language that the second user is more familiar with. Specifically, the second language may be the same as the third language. For example, user 116's preferred language may be French and language of subtitles may also be French. In some embodiments, the language of the subtitles may be different from both the language of the original audio track and the language that the second user is more familiar with. Specifically, the second language may be different from both the first language and the third language. Following from the previous example, the original audio track may be in Spanish, user 116's preferred language may be French and the subtitles may be in English.

In some embodiments, the media guidance application may, when displaying subtitles on the primary device, determine that both the first user and the second user prefer the same font and present the subtitles in that font. Specifically, the media guidance application may, when generating for display the subtitles in the first size on the first user equipment device, determine, based on accessing a user profile associated with user 110, a first font preferred by user 110. For example, the media guidance application may access a user preferences data structure associated with user 110's user profile and retrieve user 110's preferred font. For example, the media guidance application may determine that user 110's preferred font is "Courier New." The media guidance application may determine, based on accessing the user profile associated with the second user, a second font preferred by the second user. For example, the media guidance application may access a user preferences data structure associated with user 116's user profile and retrieve user 116's preferred font. For example, the media guidance application may determine that user 116's preferred font is "Courier New." The media guidance application may compare the first font with the second font to determine whether the first font is the same as the second font. For example, the media guidance application may use a Boolean comparison function to determine whether a unique identifier of the first font matches a unique identifier of the second font. The media guidance application may, in response to determining that the first font is the same as the second font, generate for display the subtitles in the first size and in the first font. For example, the media guidance application may determine that the first font is the same as the second font upon receiving a "true" result from the Boolean comparison function. The media guidance application may then display subtitles 104 on user equipment device 102 with a size of two hundred points and in the "Courier New" font.

In some embodiments, the media guidance application may, when displaying subtitles on the primary device, determine that the first user and the second user prefer different fonts. In such instances, the media guidance application may display the subtitles in another font that is similar to the fonts that the first user and the second user prefer. Specifically, in response to determining that the first font is not the same as the second font, the media guidance application may access a font selector data structure that includes a third field corresponding to a given font, a fourth field corresponding to another given font, and a fifth field corresponding to a font similar to both the given font and the another given font. As a matter of example, the media guidance application may determine, in manners described previously in relation to determining a user's preferred font, that user 110's preferred font is "Courier New" and user 116's preferred font is "Times New Roman." The media guidance application may use a Boolean comparison function to determine whether a unique identifier for "Courier New" font matches a unique identifier for "Times New Roman." The media guidance application may determine that the two fonts are different upon receiving a "false" result from the from the Boolean comparison function.

The media guidance application may determine, based on entries in the font selector data structure, whether there exists a third font that is similar to both the first font and the second font. For example, the media guidance application may query the font selector data structure for an entry that has a third field value of the first font and a fourth field value of the second font to determine whether the third font exists. As an illustrative example, the media guidance application may use SQL SELECT command (e.g., SELECT*FROM "font selector data structure" WHERE ("third field value"="Courier New") AND ("fourth field value"="Times New Roman") to perform the query. The media guidance application may determine that the third font exists upon receiving a positive query result. The query result may return a unique identifier corresponding to an entry associated with the first font and the second font, a pointer or link to an entry associated with both the first font and the second font, or an entry associated with both the first font and the second font. The media guidance application may retrieve the value corresponding to the fifth field in an entry associated with both the first font and the second font to determine the third font. For example, the media guidance application may determine, based on an entry in the font selector data structure, that the "Arial" font is similar to both the "Courier New" and "Times New Roman" fonts. The media guidance application may, in response to determining that the third font exists, generate for display subtitles in the first size and in the third font. For example, the media guidance application may display subtitles 104 on user equipment device 102 with a size of two hundred points and in the "Arial" font.

In some embodiments, the media guidance application may retrieve a specific file in order to display the subtitles in another font that is similar to both of the fonts that the first user and the second user prefer. Specifically, the media guidance application may determine, based on accessing a system requirements data structure associated with the third font, a file required to display the third font. For example, the media guidance application may access a system requirements data structure associated with "Arial" font and determine that an "Arial" font package is required in order to display the "Arial" font. The media guidance application may determine, based on accessing a system characteristics data structure associated with the first user equipment device, that user equipment device 102 is not associated with the file required to display the third font. For example, the media guidance application may access a system characteristics data structure associated with user equipment device 102 and query for an "Arial" font package. The media guidance application may determine, based on receiving a null query result, that user equipment device 102 is not associated with the "Arial" font package.

The media guidance application may transmit, to a remote server, a request for the file required to display the third font. For example, the media guidance application may transmit, using a suitable communication network, a request to a font library remote server for the "Arial" font package. The media guidance application may receive, at the first user equipment device, the file required to display the third font. For example, the media guidance application may receive a pointer or link to the "Arial" font package. The media guidance application may retrieve the "Arial" font package using the pointer or the link and store it at user equipment device 102. The media guidance application may, alternatively, receive the "Arial" font package itself from the font library remote server. The media guidance application may generate for display, based on the file required to display the third font, the subtitles in the third font. For example, the media guidance application may display, using the "Arial" font package, subtitles 104 on user equipment device 102 in the "Arial" font.

In some embodiments, the media guidance application may display the subtitles in another font that is similar to both of the fonts that the first user and the second user prefer upon determining that the primary device supports the display of the another font. Specifically, the media guidance application may determine, based on accessing a system requirements data structure associated with the third font, a system feature required to display the third font. System feature, as used herein, is defined to mean a technical characteristic associated with a user equipment device. For example, a system feature of a user equipment device may be, but is not limited to, processing power, operating system, display, network connectivity, and memory of the user equipment device. For example, the media guidance application may access a system requirements data structure associated with "Arial" font and determine that a specific operating system (e.g., macintosh operating system) is required to display the "Arial" font.

The media guidance application may determine, based on accessing a system characteristics data structure associated with the first user equipment device, whether the first user equipment device is compatible with the system feature required to display the third font. For example, the media guidance application may access a system characteristics data structure associated with user equipment device 102 to retrieve an operating system that is associated with user equipment device 102 (e.g., macintosh operating system). In some embodiments, the media guidance application may determine, based on the system feature required to display the third font matching a system feature associated with the first user equipment device, that the first user equipment device is compatible with the system feature required to display the third font. The media guidance application may, in response to determining that the first user equipment device is compatible with the system feature required to display the third font, generate for display the subtitles in the third font. Following from the previous example, the media guidance application may determine, because the operating system of user equipment device 102 is the same as the operating system required to display the "Arial" font, the operating system of user equipment device 102 is compatible with the operating system required to display the "Arial" font. The media guidance application may then display subtitles on user equipment device 102 in the "Arial" font.

In some embodiments, when the first user and the second user prefer different fonts and the subtitles are transmitted to the secondary device, the media guidance application may transmit the subtitles to the secondary device in a font that is preferred by the second user. The media guidance application may then, in addition to changing the size of the subtitles on the primary device, also change the font of the subtitles displayed on the primary to the font preferred by the first user. Specifically, the media guidance application may, when transmitting the subtitles to the second user equipment device, transmit the subtitles in the second font. The media guidance application may, when generating for display the subtitles in the second size on the first user equipment device, generate for display the subtitles in the first font. Following from the previous example, where the first user's preferred font is "Courier New" and the second user's preferred font is "Times New Roman," the media guidance application may transmit subtitles to user equipment device 118 in the "Times New Roman" font. The media guidance application may display, on user equipment device 102, subtitles with a size of one hundred points and in the "Courier New" font.

In some embodiments, the media guidance application may determine that there is no other font that is similar to both the fonts that the first user and the second user prefer. The media guidance application may then display the subtitles in a default font. Specifically, the media guidance application may, in response to determining that the third font does not exist, generate for display the subtitles in the first size and in a default font. For example, the media guidance application may query, in manners described previously in relation to querying a font selector data structure, the font selector data structure for a font that is similar to both "Courier New" and "Times New Roman." The media guidance application may determine, upon receiving a null result for the query, there is no font similar both "Courier New" and "Times New Roman." The media guidance application may access a data structure (e.g., default system settings data structure) to retrieve a default font. For example, the media guidance application may retrieve the font "Cambria" as the default font. The media guidance application may display, on user equipment device 102, subtitles 104 with a size of two hundred points and in the "Cambria" font.

In some embodiments, the media guidance application may detect, at a point in time after size of subtitles on the primary device has been adjusted to a size more suited for the first user, that the first user has left the viewing area. The media guidance application may then stop transmitting the subtitles to the secondary device and adjust the size of subtitles on the primary device back to the size suited for the second user. Specifically, the media guidance application may detect that the first user is no longer within the viewing area associated with a first user equipment device. For example, the media guidance application may determine, based on data received from a camera, that user 110 is not present within viewing area 106 associated with user equipment device 102. The media guidance application may, in response to detecting that the first user is no longer within the viewing area, discontinue transmission of the subtitles to the second user equipment device. The media guidance application may generate for display, on the first user equipment device, the subtitles in the first size. For example, the media guidance application may stop transmitting the subtitles 120 to user equipment device 118 and display the subtitles 104, with a size of two hundred points, on user equipment device 102 instead.

In some embodiments, the media guidance application may detect, at a point in time after original audio track associated with the media asset presented on the primary device has been substituted with an audio track in a language preferred by the second user, that the first user has left the viewing area. In response, the media guidance application may substitute the audio track in the language preferred by the second user with the original audio track. The media guidance application may adjust the size of the subtitles back to a size that is suited for the second user. Following from the previous example, the media asset may initially be presented, on user equipment device 102, with Spanish audio track and subtitles 104 in size two hundred points. The media guidance application may determine that user 110 is discontent with size of subtitles 104 and in response, the media guidance application may adapt size of subtitles 104 to one hundred points and substitute the Spanish audio track with the French audio track. The media guidance application may, upon determining that user 110 is no longer within viewing area 106, substitute the French audio track with the Spanish audio track and change the subtitle size back to two hundred points.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms.

Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart-phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
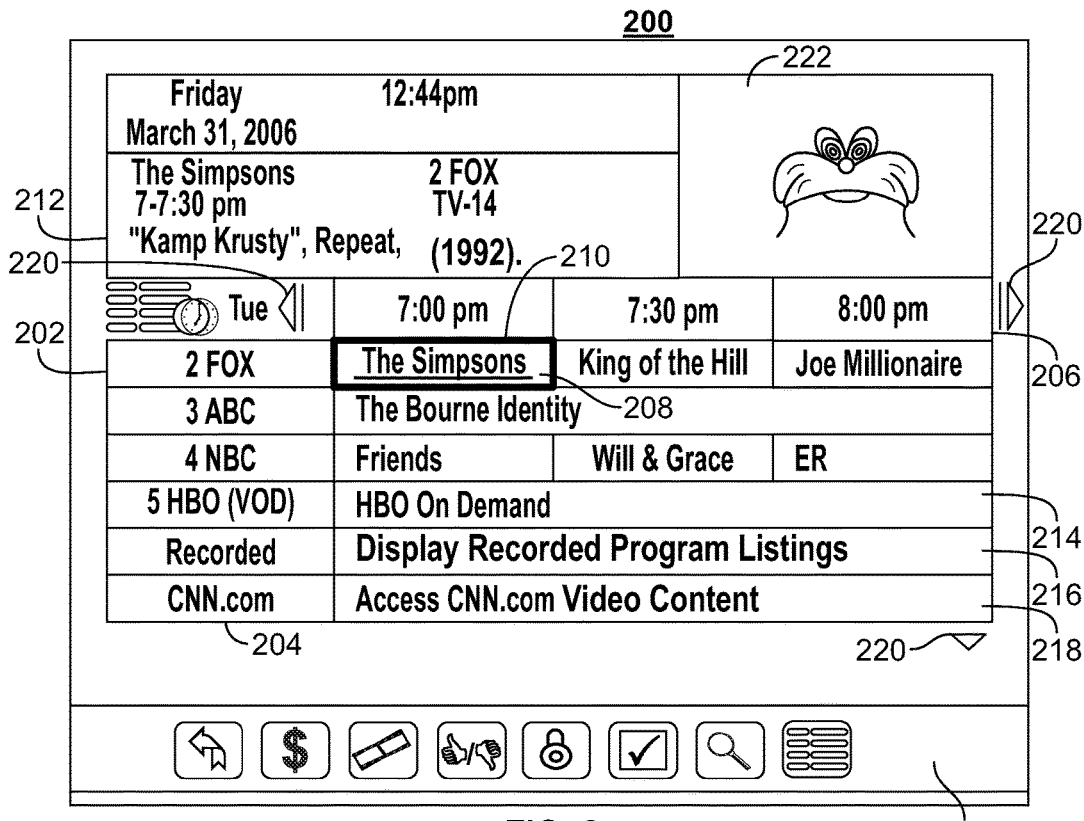
FIG. 2 shows an illustrative example of a display screen for use in accessing media content in accordance with some embodiments of the disclosure.
Figure 3:
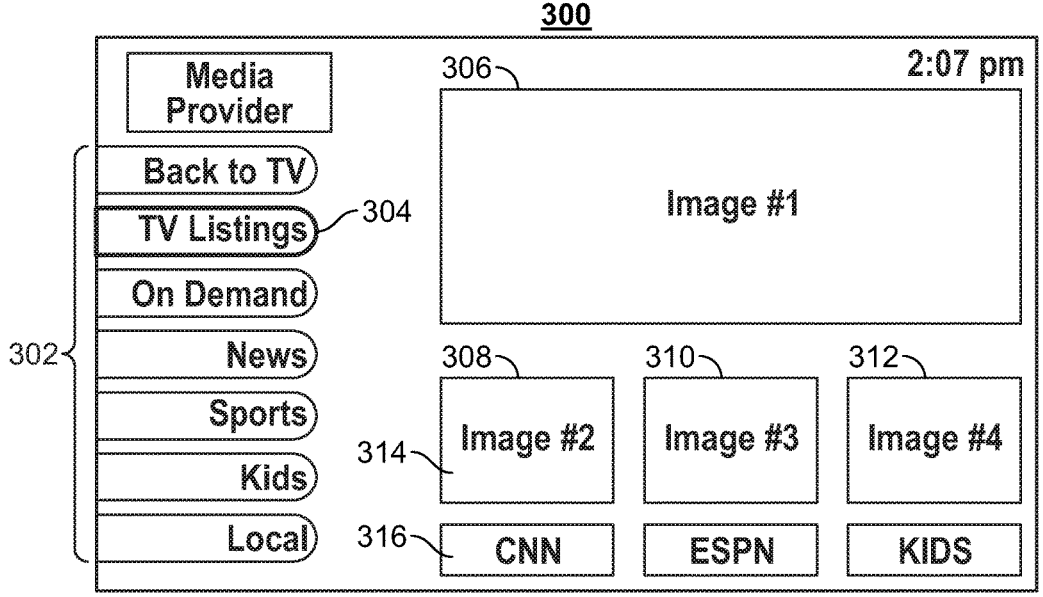
FIG. 3 shows yet another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, I I I et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
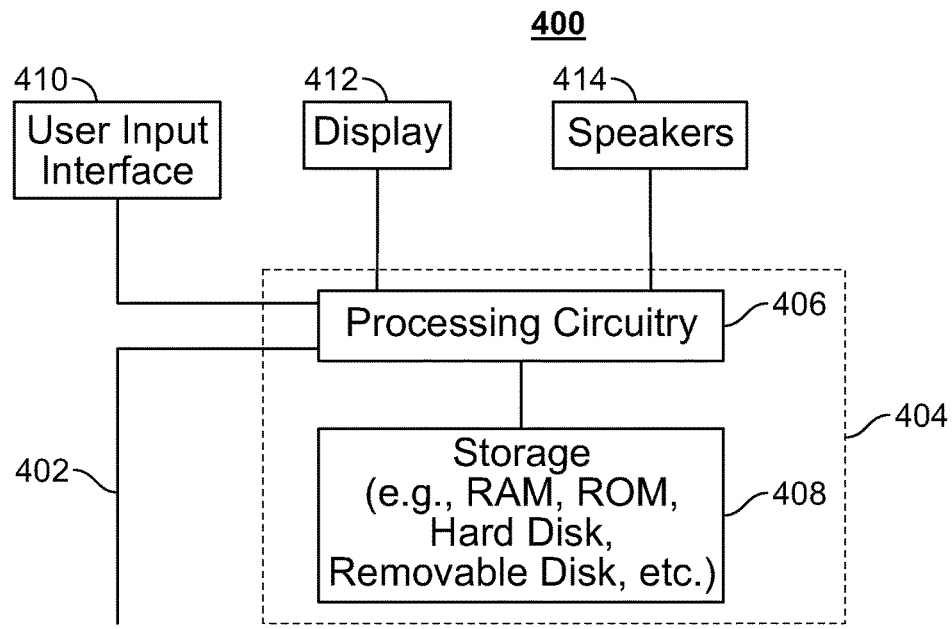
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source

516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
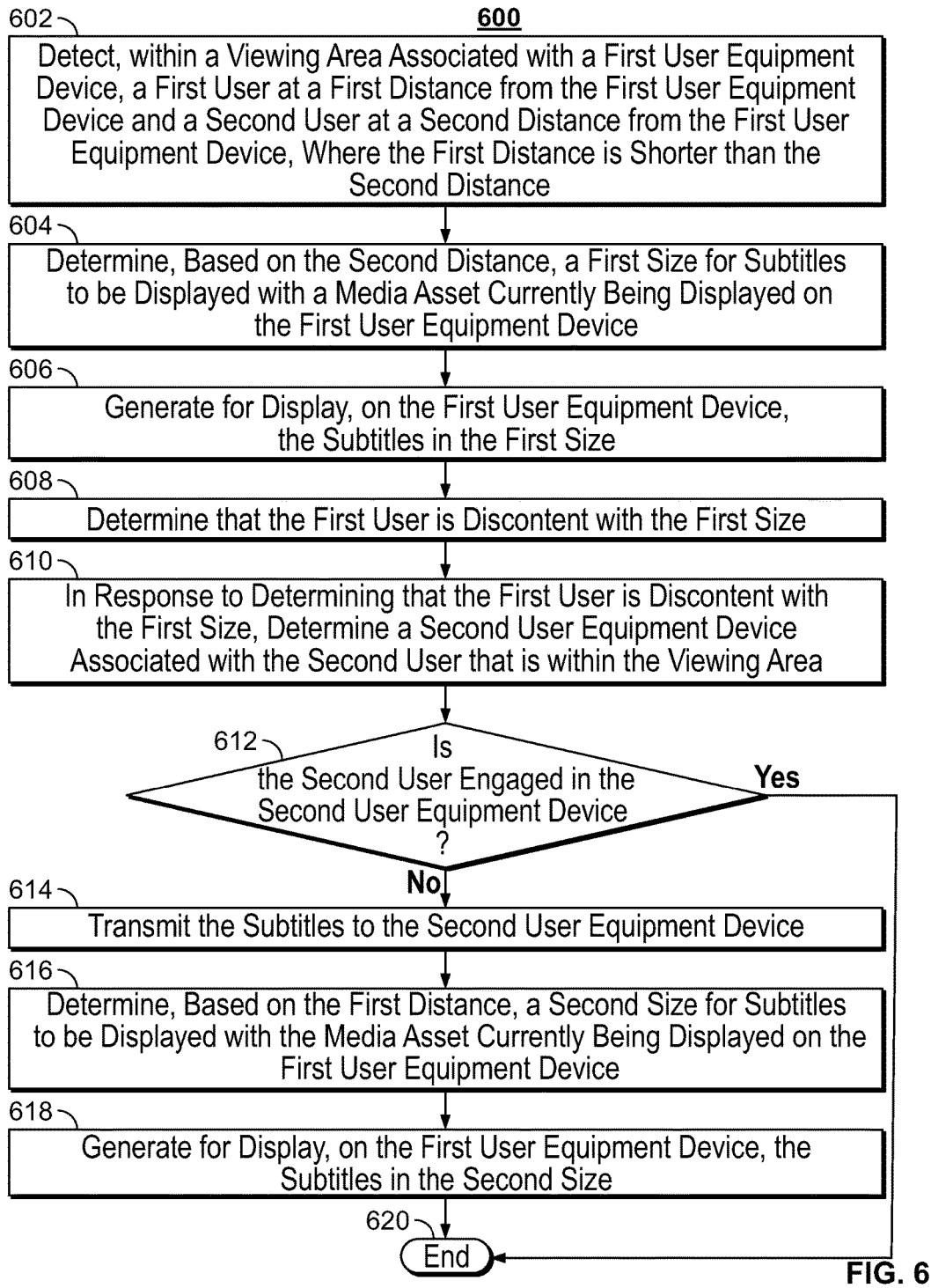
FIG. 6 is a flowchart of illustrative steps involved in adjusting, when multiple users are collectively consuming a media asset, subtitle size on a first user equipment device and causing simultaneous display of the subtitles on a second user equipment device, in accordance with some embodiments of the disclosure.

FIG. 6 is a flowchart of illustrative steps involved in adjusting, when multiple users are collectively consuming a media asset, subtitle size on a first user equipment device and causing simultaneous display of the subtitles on a second user equipment device, in accordance with some embodiments of the disclosure. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602 where control circuitry 404 detects, within a viewing area associated with a first user equipment device, a first user at a first distance from the first user equipment device and a second user at a second distance from the first user equipment device, where the first distance is shorter than the second distance. For example, control circuitry 404 may retrieve location data corresponding to user 110 (i.e., distance 112) and location data corresponding to user 116 (i.e., distance 114) from an appropriate sensor device. For example, control circuitry 404 may determine that distance 112 is two feet and distance 114 is seven feet. Control circuitry 404 may compare distance 112 and distance 114 with locations included in viewing area 106 to determine whether distance 112 and distance 114 are included in viewing area 106. Control circuitry 404 may use a comparison function to determine which of distance 112 and distance 114 is greater. Process 600 continues to 604 where control circuitry 404 determines, based on the second distance, a first size for subtitles to be displayed with a media asset currently being displayed on the first user equipment device. For example, control circuitry 404 may access a subtitle adjustment data structure, that includes information about a given user distance from a user equipment device and an optimal subtitle size for the given user distance, to retrieve a subtitle size associated with distance 114. For example, control circuitry 404 may determine that the optimal subtitle size for distance 114 (e.g., seven feet) is two hundred points.

Process 600 continues to 606 where control circuitry 404 generates for display, on the first user equipment device, the subtitles in the first size. For example, control circuitry 404 may generate subtitles 104 with a size of two hundred points on user equipment device 102 (e.g., user television equipment 502, user computer equipment 504, wireless user communications device 506). Process 600 continues to 608 where control circuitry 404 determines that the first user is discontent with the first size. For example, control circuitry 404 may monitor indicators of response to subtitles 104 to determine the response of user 110 to the first size. For example, control circuitry 404 may determine, based on data retrieved from a camera and facial recognition techniques, that the facial expression of user 110 following the presentation of subtitles 104 is a frown. Control circuitry 404 may access a data structure, located at any of storage 408, media content source 516 and media guidance data source 518, to determine a response that corresponds to a frown. Control circuitry 404 may determine that a frown corresponds to an expression of discontent.

Process 600 continues to 610 where control circuitry 404, in response to determining that the first user is discontent with the first size, determines a second user equipment device associated with the second user that is within the viewing area. The user profile associated with the second user may be stored locally at storage 408 and/or at a remote location (e.g., media content source 516 and media guidance data source 518) accessible via a communications network 514. In some embodiments, the user profile associated with the second user may include information about both user equipment devices associated with the second user and current locations of the user equipment devices associated with the second user. In such instances, control circuitry 404 may compare a current location of a given user equipment device of the user equipment devices associated with the second user with locations included in the viewing area associated with the first user equipment device to determine whether the given user equipment device is within the viewing area. As an illustrative example, control circuitry 404 may determine that that user equipment device 118 (e.g., a smart-phone) is associated with user 116 and located within viewing area 106 associated with user equipment device 102 (e.g., a television).

Process 600 continues to 612 where control circuitry 404 determines whether the second user is engaged in the second user equipment device. For example, control circuitry 404 may access a data structure associated with the user equipment device 118 (e.g., usage metrics data structure located at any of storage 408, media content source 516 and media guidance data source 518) to retrieve usage data of the user equipment device 118. Control circuitry 404 may determine, based on the retrieved usage data of user equipment device 118, an engagement level of user 116 in user equipment device 118. Control circuitry 404 may access a data structure (e.g., a default system settings data structure located at any of storage 408, media content source 516 and media guidance data source 518) to retrieve the threshold engagement level. Control circuitry 404 may execute a Boolean comparison function to determine whether the engagement level of user 116 in user equipment device 118 exceeds the threshold engagement level.

If, at 612, control circuitry 404 determines that the second user is not engaged in the second user equipment device, process 600 continues to 614. At 614, control circuitry 404 transmits the subtitles to the second user equipment device. For example, control circuitry 404 may transmit, via communication network 514, the subtitles for the media asset currently being presented on user equipment device 102 to user equipment device 118. Process 600 continues to 616 where control circuitry 404 determines, based on the first distance, a second size for subtitles to be displayed with the media asset currently being displayed on the first user equipment device. For example, control circuitry 404 may access the subtitle adjustment data structure and retrieve a subtitle size (e.g., one hundred points) corresponding to distance 114. Process 600 continues to 618 where control circuitry 404 generates for display, on the first user equipment device, the subtitles in the second size. For example, the media guidance application may generate subtitles 104 with a size of one hundred points on user equipment device 102. Process 600 then continues to 620. Process 600 also continues to 620 if, at 612, control circuitry 404 determines that the second user is engaged in the second user equipment device. At 620, process 600 terminates.

Figure 7:
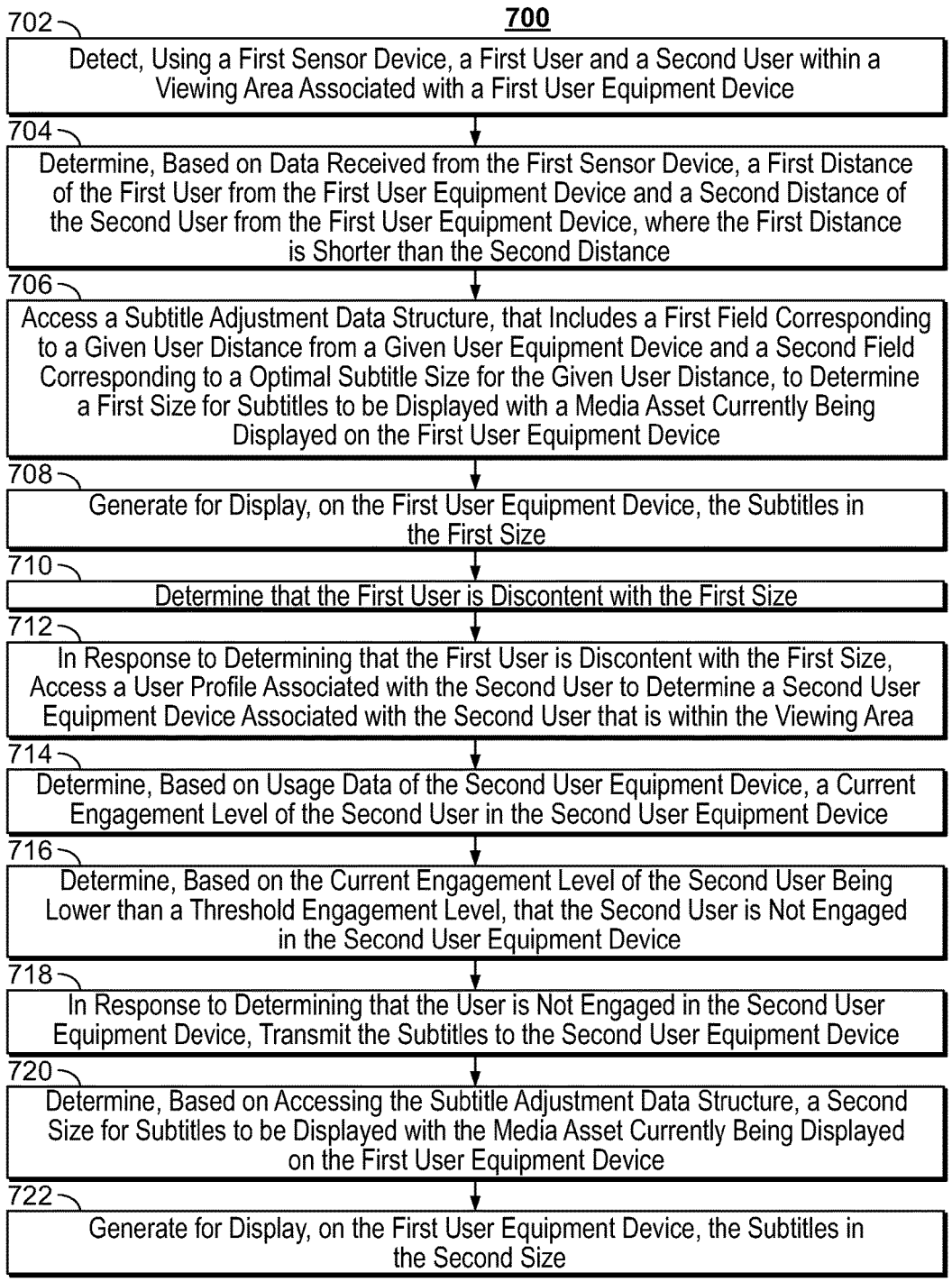
FIG. 7 is another flowchart of illustrative steps involved in adjusting, when multiple users are collectively consuming a media asset, subtitle size on a first user equipment device and causing simultaneous display of the subtitles on a second user equipment device, in accordance with some embodiments of the disclosure.

FIG. 7 is another flowchart of illustrative steps involved in adjusting, when multiple users are collectively consuming a media asset, subtitle size on a first user equipment device and causing simultaneous display of the subtitles on a second user equipment device, in accordance with some embodiments of the disclosure. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 700 may be incorporated into or combined with one or more steps of any other process or embodiment.

Process 700 begins at 702 where control circuitry 404 detects, using a first sensor device, a first user and a second user within a viewing area associated with a first user equipment device. Control circuitry 404 may retrieve data from sensor device 108 and analyze the data to determine a location of user 110 and a location of user 116. Control circuitry 404 may compare locations of user 110 and user 116 with locations included in viewing area 106. The media guidance application may determine, based on locations of user 110 and user 116 matching locations included in viewing area 106, that user 110 and user 116 are within viewing area 106. Process 700 continues to 704 where control circuitry 404 determines, based on data received from the first sensor device, a first distance of the first user from the first user equipment device and a second distance of the second user from the first user equipment device, where the first distance is shorter than the second distance. Control circuitry 404 may retrieve, from data received from sensor device 108, location data corresponding to user 110 (i.e., distance 112) and location data corresponding to user 116 (i.e., distance 114). For example, control circuitry 404 may determine that distance 112 is two feet and distance 114 is seven feet. Control circuitry 404 may execute a comparison function to determine which of distance 112 and distance 114 is greater.

Process 700 continues to 706 where control circuitry 404 accesses a subtitle adjustment data structure, which includes a first field corresponding to a given user distance from a given user equipment device and a second field corresponding to a optimal subtitle size for the given user distance, to determine a first size for subtitles to be displayed with a media asset currently being displayed on the first user equipment device. For example, control circuitry 404 may access a subtitle adjustment data structure, that includes a first field corresponding to a given user distance from a given user equipment device and a second field corresponding to an optimal subtitle size for the given user distance, to determine a first size for subtitles to be displayed with a media asset currently being displayed on user equipment device. As an illustrative example, the subtitle adjustment data structure may be a subtitle adjustment database. Control circuitry 404 may query, using database management languages such as SQL, JAPQL, CODASYL or another suitable language, the subtitle adjustment database for an entry that is associated with a first field value of distance 114 (e.g., seven feet). Control circuitry 404 may retrieve the value corresponding to the second field of the entry to determine the optimal subtitle size for distance 114 (e.g., seven feet). For example, control circuitry 404 may determine that the optimal subtitle size for distance 114 (e.g., seven feet) is two hundred points.

Process 700 continues to 708 where control circuitry 404 generates for display, on the first user equipment device, the subtitles in the first size. For example, the media guidance application may generate subtitles 104 with a size of two hundred points on user equipment device 102. Process 700 continues to 710 where control circuitry 404 determines that the first user is discontent with the first size. For example, control circuitry 404 may monitor indicators of response to subtitles 104 to determine the response of user 110 to the first size. For example, control circuitry 404 may determine, based on data retrieved from a camera and facial recognition techniques, that facial expression of user 110 following the presentation of subtitles 104 is a frown. Control circuitry 404 may access a data structure, located at any of storage 408, media content source 516 and media guidance data source 518, to determine a response that corresponds to a frown. Control circuitry 404 may determine that a frown corresponds to an expression of discontent.

Process 700 continues to 712 where control circuitry 404, in response to determining that the first user is discontent with the first size, accesses a user profile associated with the second user to determine a second user equipment device associated with the second user that is within the viewing area. As an illustrative example, control circuitry 404 may instruct a Bluetooth low energy beacon to broadcast a signal over a given radius where the given radius encompasses viewing area 106. User equipment device 118 in the given radius may receive the signal at some signal strength and relay information about the received signal strength to the media guidance application. Control circuitry 404 may determine, based on the signal strength received by user equipment device 118 and data regarding impact of distance on signal strength attenuation, a current location of user equipment device 118. Control circuitry 404 may then compare the current location of user equipment device 118 with locations included in viewing area 106 to determine whether user equipment device 118 is in viewing area 106. Control circuitry 404 may access user 116's user profile to determine identifier(s) of user equipment device(s) associated with user 116. Control circuitry 404 may compare an identifier associated with user equipment device 118 with identifier(s) of user equipment device(s) associated with user 116 to determine whether user equipment device 118 is associated with user 116. In some embodiments, control circuitry 404 may determine that user equipment device 118 is associated with user 116 and located within viewing area 106 associated with user equipment device 102 (e.g., a television).

Process 700 continues to 714 where control circuitry 404 determines, based on usage data of the second user equipment device, a current engagement level of the second user in the second user equipment device. For example, control circuitry 404 may access a data structure associated with the user equipment device 118 (e.g., a usage metrics data structure located at any of storage 408, media content source 516 and media guidance data source 518) to retrieve usage data of the user equipment device 118. Control circuitry 404 may determine, based on the retrieved usage data of user equipment device 118, an engagement level of user 116 in user equipment device 118. As a matter of example, control circuitry 404 may determine, based on the retrieved usage data of user equipment device 118, that no application is running on user equipment device 118. Control circuitry 404 may access a look-up table to determine that the engagement level that corresponds to no application running on user equipment device 118 is zero.

Process 700 continues to 716 where control circuitry 404 determines, based on the current engagement level of the second user in the second user equipment device being lower than a threshold engagement level, that the second user is not engaged in the second user equipment device. For example, control circuitry 404 may access a data structure (e.g., a default system settings data structure) to retrieve the threshold engagement level. As a matter of example, the threshold engagement level may be five. Control circuitry 404 may execute a comparison function to determine whether the current engagement level of the second user in the second user equipment device exceeds the threshold engagement level. Following from the previous example, where the engagement level of user 116 in user equipment device 118 is zero, control circuitry 404 may determine that the current engagement level in user equipment device 118 is less than the threshold engagement level.

Process 700 continues to 718 where control circuitry 404, in response to determining that the user is not engaged in the second user equipment device, transmits the subtitles to the second user equipment device. For example, control circuitry 404 may transmit, via communication network 514, the subtitles for the media asset currently being presented on user equipment device 102 to user equipment device 118. Process 700 continues to 720 where control circuitry 404 determines, based on accessing the subtitle adjustment data structure, a second size for subtitles to be displayed with the media asset currently being displayed on the first user equipment device. For example, control circuitry 404 may access the subtitle adjustment data structure and retrieve a subtitle size (e.g., one hundred points) corresponding to distance 114. Process 700 continues to 722 where control circuitry 404 generates for display, on the first user equipment device, the subtitles in the second size. For example, the media guidance application may generate subtitles 104 with a size of one hundred points on user equipment device 102. The second size is a size that is more suited to the first user to read. The second user, located at a greater distance from the first user equipment device than the first user, may have difficulty reading the subtitles in the second size.

Figure 8:
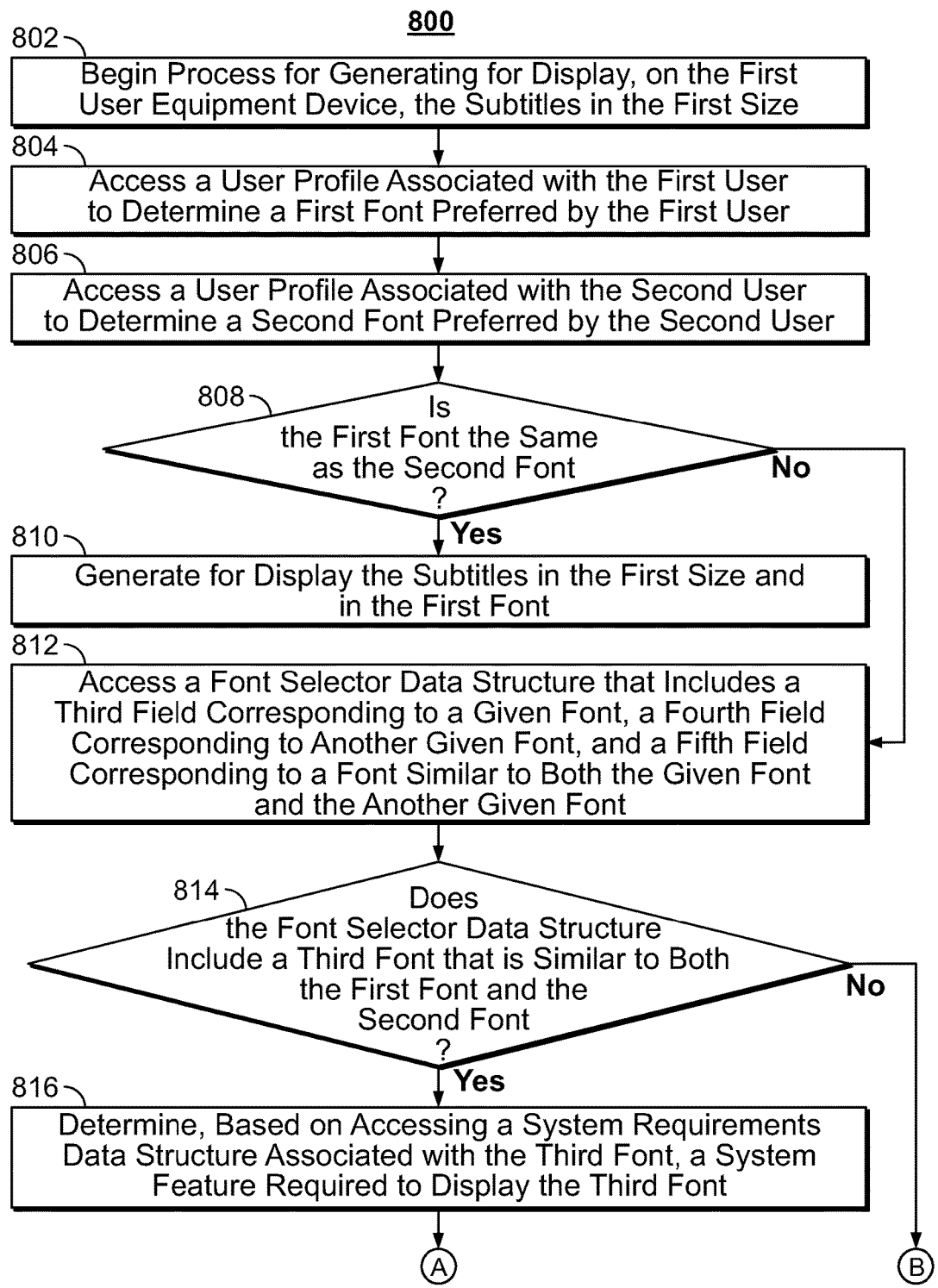
FIG. 8 is a flowchart of illustrative steps involved in determining a font for the subtitles displayed on the first user equipment, in accordance with some embodiments of the disclosure.
Figure 8:
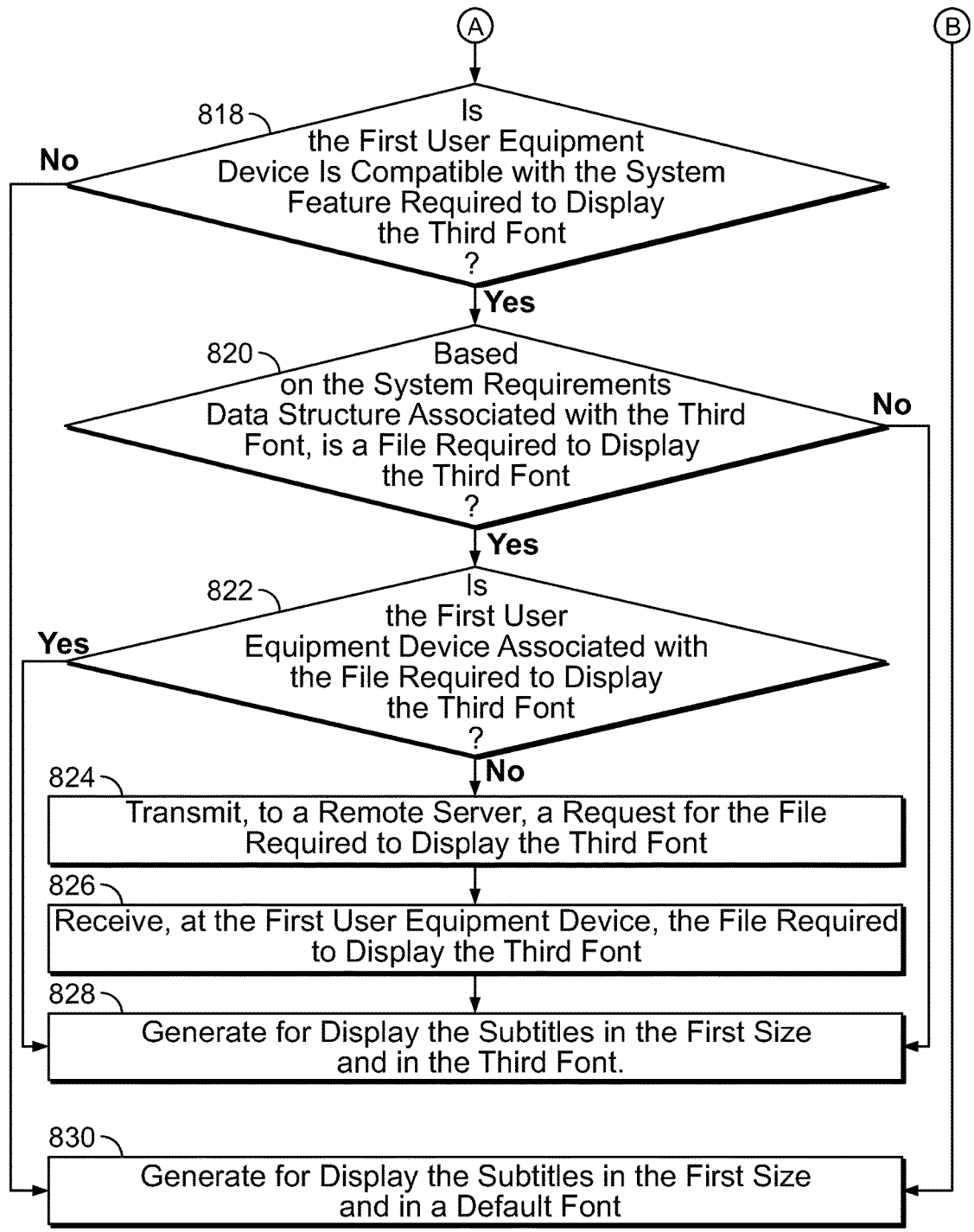

FIG. 8 is a flowchart of illustrative steps involved in determining a font for the subtitles displayed on the first user equipment, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment.

Process 800 begins at 802 where control circuitry 404 begins a process for generating for display, on the first user equipment device, the subtitles in the first size. Process 800 continues to 804 where control circuitry 404 accesses a user profile associated with the first user to determine a first font preferred by the first user. For example, control circuitry 404 may access a user preferences data structure associated with user 110's user profile and retrieve user 110's preferred font (e.g., "Courier New"). Process 800 continues to 806 where control circuitry 404 accesses a user profile associated with the second user to determine a second font preferred by the second user. For example, control circuitry 404 may access a user preferences data structure associated with user 116's user profile and retrieve user 116's preferred font (e.g., Times New Roman). Process 800 continues to 808 where control circuitry 404 determines whether the first font is the same as the second font. For example, control circuitry 404 may execute a Boolean comparison function to determine whether user 110's preferred font matches user 116's preferred font.

If, at 808, control circuitry 404 determines that the first font is the same as the second font, process 800 continues to 810. For example, control circuitry 404 may determine that user 110's preferred font is the same as user 116's preferred font upon receiving a "true" result from the Boolean comparison function. At 810, control circuitry 404 generates for display the subtitles in the first size and in the first font. If, at 808, control circuitry 404 determines that the first font is different from the second font, process 800 continues to 812. For example, control circuitry 404 may determine that the two fonts are different upon receiving a "false" result from the from the Boolean comparison function.

At 812, control circuitry 404 accesses a font selector data structure that includes a third field corresponding to a given font, a fourth field corresponding to another given font, and a fifth field corresponding to a font similar to both the given font and the another given font. Process 800 continues to 814 where control circuitry 404 determines whether the font selector data structure includes a third font that is similar to both the first font and the second font. For example, control circuitry 404 may query the font selector data structure for an entry that has a third field value of user 110's preferred font and a fourth field value of user 116's preferred font to determine whether the third font exists. If, at 814, control circuitry 404 determines that the font selector data structure does not include a third font that is similar to both the first font and the second font, process 800 continues to 830. For example, control circuitry 404 may determine that the font selector data structure does not include a third font that is similar to both user 110's preferred font and user 116's preferred font upon receiving a null result to the query. At 830, control circuitry 404 generates for display the subtitles in the first size and in a default font. For example, control circuitry 404 may receive a null response to the query and continue on to 830. Control circuitry 404 may access a data structure (e.g., default system settings data structure) to retrieve a default font. For example, control circuitry 404 may retrieve the font "Cambria" as the default font. Control circuitry 404 may display, on user equipment device 102, subtitles 104 in the first size and in the "Cambria" font.

If, at 814, control circuitry 404 determines that the font selector data structure includes a third font that is similar to both the first font and the second font, process 800 continues to 816. For example, control circuitry 404 may receive, in response to the query, an unique identifier corresponding to an entry associated with both user 110's preferred font and user 116's preferred font. Control circuitry 404 may retrieve the third font from the entry associated with both user 110's preferred font and user 116's preferred font. As a matter of example, the third font may be "Arial." At 816, control circuitry 404 determines, based on accessing a system requirements data structure associated with the third font, a system feature required to display the third font. For example, control circuitry 404 may access a system requirements data structure associated with "Arial" font and determine that a specific operating system (e.g., a macintosh operating system) is required to display the "Arial" font. Process 800 continues to 818 where control circuitry 404 determines whether the first user equipment device is compatible with the system feature required to display the third font. For example, control circuitry 404 may access a system characteristics data structure associated with user equipment device 102 to retrieve an operating system associated with user equipment device 102 (e.g., a macintosh operating system).

If, at 818, control circuitry 404 determines that the first user equipment device is not compatible with the system feature required to display the third font, process 800 continues to 830. At 830, control circuitry 404 generates for display the subtitles in the first size and in a default font. If, at 818, control circuitry 404 determines that the first user equipment device is compatible with the system feature required to display the third font, process 800 continues to 820. Following from the previous example, control circuitry 404 may determine, because the operating system of user equipment device 102 is the same as the operating system required to display the "Arial" font, the operating system of user equipment device 102 is compatible with the operating system required to display the "Arial" font. At 820, control circuitry 404 determines, based on the system requirements data structure associated with the third font, whether a file is required to display the third font.

If, at 820, control circuitry 404 determines that a file is required to display the third font, process 800 continues to 822. For example, control circuitry 404 may access a system requirements data structure associated with "Arial" font and determine that an "Arial" font package is required in order to display the "Arial" font. At 822, control circuitry 404 determines whether the first user equipment device associated with the file required to display the third font. For example, control circuitry 404 may access system characteristics data structure associated with user equipment device 102 and query for an "Arial" font package. If, at 822, control circuitry 404 determines that the first user equipment device is not associated with the file required to display the third font, process 800 continues to 824. For example, control circuitry 404 may determine, based on receiving a null query result, that user equipment device 102 is not associated with the "Arial" font package. At 824, control circuitry 404 transmits, to a remote server, a request for the file required to display the third font. For example, control circuitry 404 may transmit, via communication network 514, a request to a font library remote server for the "Arial" font package.

Process 800 continues to 826 where control circuitry 404 receives, at the first user equipment device, the file required to display the third font. For example, control circuitry 404 may receive a pointer or link to the "Arial" font package. Control circuitry 404 may retrieve the "Arial" font package using the pointer or the link and store it at user equipment device 102. Control circuitry 404 may, alternatively, receive the "Arial" font package itself from the font library remote server. Process 800 continues to 828 where control circuitry 404 generates for display the subtitles in the first size and in the third font. Process 800 also continues to 828 if, at 820, control circuitry 404 determines that no file is required to display the third font. Process 800 also continues to 828 if, at 822, control circuitry 404 determines that the first user equipment device is associated with the file required to display the third font. For example, control circuitry 404 may display, using the "Arial" font package, subtitles 104 on user equipment device 102 in the "Arial" font.

Figure 9:
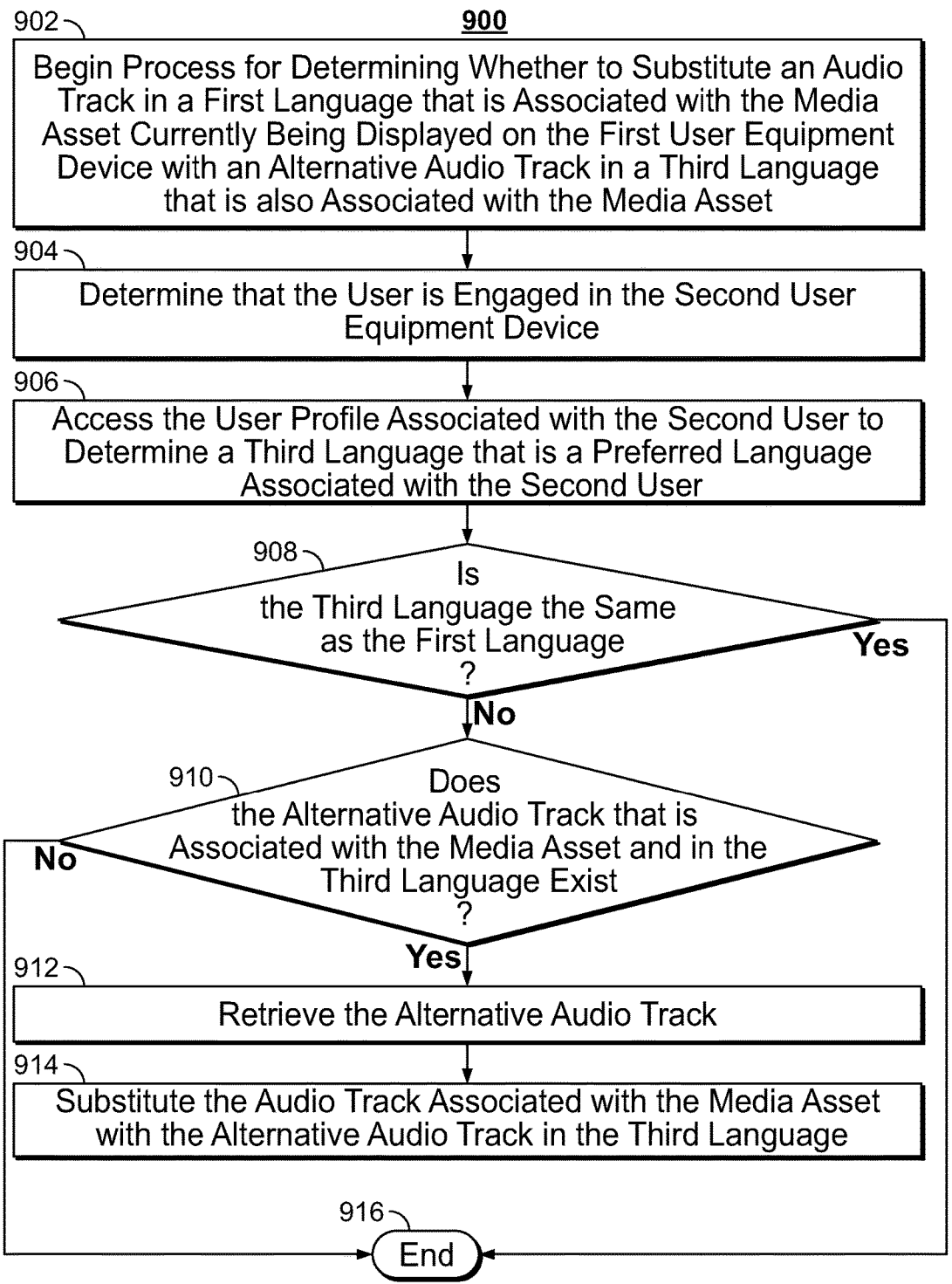
FIG. 9 is a flowchart of illustrative steps involved in substituting an audio track associated with a media asset currently being displayed with an alternative sound track, in accordance with some embodiments of the disclosure.

FIG. 9 is a flowchart of illustrative steps involved in substituting an audio track associated with a media asset currently being displayed with an alternative sound track, in accordance with some embodiments of the disclosure. Process 900 may be executed by control circuitry 404 (FIG. 4) as instructed by the media guidance application. Control circuitry 404 may be implemented on user equipment 502, 504, and/or 506 (FIG. 5). In addition, one or more steps of process 900 may be incorporated into or combined with one or more steps of any other process or embodiment. Control circuitry 404 may execute process 900 upon determining, at 612, that the second user is engaged in the second user equipment.

Process 900 begins at 902 where control circuitry 404 begins process for determining whether to substitute an audio track in a first language that is associated with the media asset currently being displayed on the first user equipment device with an alternative audio track in a third language that is also associated with the media asset. For example, the audio track in the first language may be a Spanish audio track. Process 900 continues to 904 where control circuitry 404 determines that the user is engaged in the second user equipment device. For example, control circuitry 404 may determine, in manners described previously in relation to determining an engagement level of a user in a user equipment device, that user 116 is engaged in user equipment device 118. Process 900 continues to 906 where control circuitry 404 accesses the user profile associated with the second user to determine a third language that is a preferred language associated with the second user. For example, control circuitry 404 may access the user 116's user profile to retrieve user 116's preferred language. For example, control circuitry 404 may determine that user 116's preferred language is French.

Process 900 continues 908 where control circuitry 404 determines whether the third language is the same as the first language. Control circuitry 404 may execute a Boolean comparison function to determine whether the first language and the third language are the same. If, at 908, control circuitry 404 determines that the third language is the same as the first language, process 900 continues to 916. At 916, process 900 terminates. For example, control circuitry 404 may receive a "true" result from the Boolean comparison function and proceed to 916. If, at 908, control circuitry 404 determines that the third language is not the same as the first language, process 900 continues to 910. For example, control circuitry 404 may receive a "false" result from the Boolean comparison function and proceed to 916. At 910, control circuitry 404 determines whether the alternative audio track that is associated with the media asset and in the third language exists. For example, control circuitry 404 may query media content source 516 and/or media guidance data source 518 for a specific audio track that is associated with the media asset. As a matter of example, control circuitry 404 may query media content source 516 and/or media guidance data source 518 for a French audio track associated with the media asset currently being presented on user equipment device 102.

If, at 910, control circuitry 404 determines that the alternative audio track that is associated with the media asset and in the third language exists, process 900 continues to 912. At 912, control circuitry 404 retrieves the alternative audio track. For example, control circuitry 404 may receive a positive result to the query for a French audio track associated with the media asset currently being presented on user equipment device 102. The result may include a unique or specific identifier associated with the French audio track or a pointer or link to the French audio track which control circuitry 404 may use to retrieve the French audio track. Process 900 continues to 914 where control circuitry 404 substitutes the audio track associated with the media asset with the alternative audio track in the third language. For example, control circuitry 404 may substitute the Spanish audio track of the media asset currently being presented on user equipment device 102 with the French audio track. If, at 910, control circuitry 404 determines that the alternative audio track that is associated with the media asset and in the third language does not exist, process 900 continues to 916. At 916, process 900 terminates.

It should be noted that processes 600-900 or any step thereof could be performed on, or provided by, any of the devices shown in FIGS. 4-5. For example, any of processes 600-900 may be executed by control circuitry 404 (FIG. 4) as instructed by the media guidance application implemented on user equipment 502, 504, and/or 506 (FIG. 5). In addition, one or more steps of process 600-900 may be incorporated into or combined with one or more steps of any other process or embodiment.

It is contemplated that the steps or descriptions of FIGS. 6-9 may be used with any other embodiment of this disclosure. In addition, the steps and descriptions described in relation to FIG. 6-9 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying subtitles, the method comprising:
    detecting, using a first sensor device, a first user and a second user within a viewing area associated with a first user equipment device;
    determining, based on data received from the first sensor device, a first distance of the first user from the first user equipment device and a second distance of the second user from the first user equipment device, wherein the first distance is shorter than the second distance;
    accessing a subtitle adjustment data structure, that includes a first field corresponding to a given user distance from a given user equipment device and a second field corresponding to a optimal subtitle size for the given user distance, to determine a first size for subtitles to be displayed with a media asset currently being displayed on the first user equipment device;
    generating for display, on the first user equipment device, the subtitles in the first size;
    monitoring a response of the first user to the subtitles;
    determining, based on the response of the first user to the subtitles, that the first user is discontent with the first size;
    in response to determining that the first user is discontent with the first size, accessing a user profile associated with the second user to determine a second user equipment device associated with the second user that is within the viewing area;
    determining, based on usage data of the second user equipment device, a current engagement level of the second user in the second user equipment device;
    determining, based on the current engagement level of the second user in the second user equipment device being lower than a threshold engagement level, that the second user is not engaged in the second user equipment device;
    in response to determining that the user is not engaged in the second user equipment device, transmitting the subtitles to the second user equipment device;
    determining, based on accessing the subtitle adjustment data structure, a second size for subtitles to be displayed with the media asset currently being displayed on the first user equipment device; and
    generating for display, on the first user equipment device, the subtitles in the second size.

2. The method of claim 1, wherein audio track associated with the media asset currently being displayed on the first user equipment device is in a first language and the subtitles are in a second language, further comprising:
    in response to determining that the user is engaged in the second user equipment device, accessing the user profile associated with the second user to determine a preferred language associated with the second user;
    determining that the preferred language associated with the second user is a third language, wherein the third language is not the first language;
    in response to determining that the preferred language associated with the second user is the third language, determining whether there exists an alternative audio track that is associated with the media asset and in the third language;
    in response to determining that an alternative audio track that is associated with the media asset and in the third language exists, retrieving the alternative audio track;
    substituting the audio track associated with the media asset with the alternative audio track in the third language; and
    generating for simultaneous display with the media asset, on the first user equipment device, the subtitles in the second language and in the second size.

3. The method of claim 1, wherein generating for display, on the first user equipment device, the subtitles in the first size further comprises:
    determining, based on accessing a user profile associated with the first user, a first font preferred by the first user;
    determining, based on accessing the user profile associated with the second user, a second font preferred by the second user;
    comparing the first font with the second font to determine whether the first font is the same as the second font; and
    in response to determining that the first font is the same as the second font, generating for display the subtitles in the first size and in the first font.

4. The method of claim 1, further comprising:
    detecting that the first user is no longer within the viewing area associated with a first user equipment device;
    in response to detecting that the first user is no longer within the viewing area, discontinuing transmission of the subtitles to the second user equipment device; and
    generating for display, on the first user equipment device, the subtitles in the first size.

5. The method of claim 2, wherein the second language is at least one of:
    the same as the first language;
    the same as the third language; and
    different from both the first language and the third language.

6. The method of claim 3, further comprising:
    in response to determining that the first font is not the same as the second font, accessing a font selector data structure, that includes a third field corresponding to a given font, a fourth field corresponding to another given font, and a fifth field corresponding to a font similar to both the given font and the another given font, to determine whether there exists a third font that is similar to both the first font and the second font; and
    in response to determining that the third font exists, generating for display the subtitles in the first size and in the third font.

7. The method of claim 6, wherein:
transmitting the subtitles to the second user equipment device further comprises transmitting the subtitles in the second font; and
generating for display, on the first user equipment device, the subtitles in the second size further comprises generating for display the subtitles in the first font.

8. The method of claim 6, wherein generating for display the subtitles in the third font further comprises:
determining, based on accessing a system requirements data structure associated with the third font, a file required to display the third font;
determining, based on accessing a system characteristics data structure associated with the first user equipment device, that the first user equipment device is not associated with the file required to display the third font;
transmitting, to a remote server, a request for the file required to display the third font;
receiving, at the first user equipment device, the file required to display the third font; and
generating for display, based on the file required to display the third font, the subtitles in the third font.

9. The method of claim 6, wherein generating for display the subtitles in the third font further comprises:
determining, based on accessing a system requirements data structure associated with the third font, a system feature required to display the third font;
determining, based on accessing a system characteristics data structure associated with the first user equipment device, whether the first user equipment device is compatible with the system feature required to display the third font; and
in response to determining that that the first user equipment device is compatible with the system feature required to display the third font, generating for display the subtitles in the third font.

10. The method of claim 6, further comprising, in response to determining that the third font does not exist, generating for display the subtitles in the first size and in a default font.

11. A system for displaying subtitles, the system comprising:
control circuitry configured to:
detect, using a first sensor device, a first user and a second user within a viewing area associated with a first user equipment device;
determine, based on data received from the first sensor device, a first distance of the first user from the first user equipment device and a second distance of the second user from the first user equipment device, wherein the first distance is shorter than the second distance;
access a subtitle adjustment data structure, that includes a first field corresponding to a given user distance from a given user equipment device and a second field corresponding to a optimal subtitle size for the given user distance, to determine a first size for subtitles to be displayed with a media asset currently being displayed on the first user equipment device;
generate for display, on the first user equipment device, the subtitles in the first size;
monitor a response of the first user to the subtitles;
determine, based on the response of the first user to the subtitles, that the first user is discontent with the first size;
in response to determining that the first user is discontent with the first size, access a user profile associated with the second user to determine a second user equipment device associated with the second user that is within the viewing area;
determine, based on usage data of the second user equipment device, a current engagement level of the second user in the second user equipment device;
determine, based on the current engagement level of the second user in the second user equipment device being lower than a threshold engagement level, that the second user is not engaged in the second user equipment device;
in response to determining that the user is not engaged in the second user equipment device, transmit the subtitles to the second user equipment device;
determine, based on accessing the subtitle adjustment data structure, a second size for subtitles to be displayed with the media asset currently being displayed on the first user equipment device; and
generate for display, on the first user equipment device, the subtitles in the second size.

12. The system of claim 11, wherein audio track associated with the media asset currently being displayed on the first user equipment device is in a first language and the subtitles are in a second language, wherein the control circuitry is further configured to:
in response to determining that the user is engaged in the second user equipment device, access the user profile associated with the second user to determine a preferred language associated with the second user;
determine that the preferred language associated with the second user is a third language, wherein the third language is not the first language;
in response to determining that the preferred language associated with the second user is the third language, determine whether there exists an alternative audio track that is associated with the media asset and in the third language;
in response to determining that an alternative audio track that is associated with the media asset and in the third language exists, retrieve the alternative audio track;
substitute the audio track associated with the media asset with the alternative audio track in the third language; and
generate for simultaneous display with the media asset, on the first user equipment device, the subtitles in the second language and in the second size.

13. The system of claim 11, wherein the control circuitry is further configured, when generating for display, on the first user equipment device, the subtitles in the first size, to:
determine, based on accessing a user profile associated with the first user, a first font preferred by the first user;
determine, based on accessing the user profile associated with the second user, a second font preferred by the second user;
compare the first font with the second font to determine whether the first font is the same as the second font; and
in response to determining that the first font is the same as the second font, generate for display the subtitles in the first size and in the first font.

14. The system of claim 11, wherein the control circuitry is further configured to:
detect that the first user is no longer within the viewing area associated with a first user equipment device;

in response to detecting that the first user is no longer within the viewing area, discontinue transmission of the subtitles to the second user equipment device; and generate for display, on the first user equipment device, the subtitles in the first size.

15. The system of claim 12, wherein the second language is at least one of:

the same as the first language;

the same as the third language; and different from both the first language and the third language.

16. The system of claim 13, wherein the control circuitry is further configured to:

in response to determining that the first font is not the same as the second font, access a font selector data structure, that includes a third field corresponding to a given font, a fourth field corresponding to another given font, and a fifth field corresponding to a font similar to both the given font and the another given font, to determine whether there exists a third font that is similar to both the first font and the second font; and in response to determining that the third font exists, generate for display the subtitles in the first size and in the third font.

17. The system of claim 16, wherein the control circuitry is further configured to:

transmit the subtitles in the second font when transmitting the subtitles to the second user equipment device; and generate for display the subtitles in the first font when generating for display, on the first user equipment device, the subtitles in the second size.

18. The system of claim 16, wherein generating for display the subtitles in the third font further comprises the control circuitry configured to:

determine, based on accessing a system requirements data structure associated with the third font, a file required to display the third font;

determine, based on accessing a system characteristics data structure associated with the first user equipment device, that the first user equipment device is not associated with the file required to display the third font;

transmit, to a remote server, a request for the file required to display the third font;

receive, at the first user equipment device, the file required to display the third font; and generate for display, based on the file required to display the third font, the subtitles in the third font.

19. The system of claim 16, wherein the control circuitry, when generating for display the subtitles in the third font, is further configured to:

determine, based on accessing a system requirements data structure associated with the third font, a system feature required to display the third font;

determine, based on accessing a system characteristics data structure associated with the first user equipment device, whether the first user equipment device is compatible with the system feature required to display the third font; and in response to determining that that the first user equipment device is compatible with the system feature required to display the third font, generate for display the subtitles in the third font.

20. The system of claim 16, wherein the control circuitry is further configured to, in response to determining that the third font does not exist, generate for display the subtitles in the first size and in a default font.

* * * * *